United States Patent
Saha et al.

(10) Patent No.: US 9,695,877 B2
(45) Date of Patent: Jul. 4, 2017

(54) TORQUE TUBE MANUFACTURING METHODS

(71) Applicant: The Boeing Company, Chicago, IL (US)

(72) Inventors: Pradip K. Saha, Bellevue, WA (US); Mark R. Meyer, Edmonds, WA (US); Mark E. Bice, Renton, WA (US)

(73) Assignee: The Boeing Company, Chicago, IL (US)

( * ) Notice: Subject to any disclaimer, the term of this patent is extended or adjusted under 35 U.S.C. 154(b) by 478 days.

(21) Appl. No.: 14/444,175

(22) Filed: Jul. 28, 2014

(65) Prior Publication Data
US 2016/0025146 A1    Jan. 28, 2016

(51) Int. Cl.
*B21D 26/14* (2006.01)
*F16D 1/104* (2006.01)
*F16D 48/06* (2006.01)
*B23P 15/00* (2006.01)

(52) U.S. Cl.
CPC ............. *F16D 1/104* (2013.01); *B21D 26/14* (2013.01); *F16D 48/064* (2013.01); *B23P 15/00* (2013.01); *F16D 2500/5116* (2013.01); *Y10T 29/49803* (2015.01)

(58) Field of Classification Search
CPC ............... Y10T 29/49803; B21D 26/14; B22F 2202/05; B30B 1/42
See application file for complete search history.

(56) References Cited

U.S. PATENT DOCUMENTS

| | | | |
|---|---|---|---|
| 4,807,351 A * | 2/1989 | Berg | B21D 26/14 29/419.2 |
| 6,932,118 B2 * | 8/2005 | Saha et al. | |
| 7,363,945 B2 * | 4/2008 | Saha et al. | |

* cited by examiner

Primary Examiner — Jermie Cozart
(74) Attorney, Agent, or Firm — Kwan & Olynick LLP

(57) ABSTRACT

One aspect of the present disclosure relates to an apparatus comprising a first end fitting. The first end fitting comprises a tube engagement portion. The tube engagement portion comprises an outer coupling surface. The outer coupling surface comprises a first virtual cross-section. The first virtual cross-section comprises a first transverse inflection point. Each point along the first virtual cross-section has a first virtual tangent line coplanar with the first virtual cross-section.

19 Claims, 17 Drawing Sheets

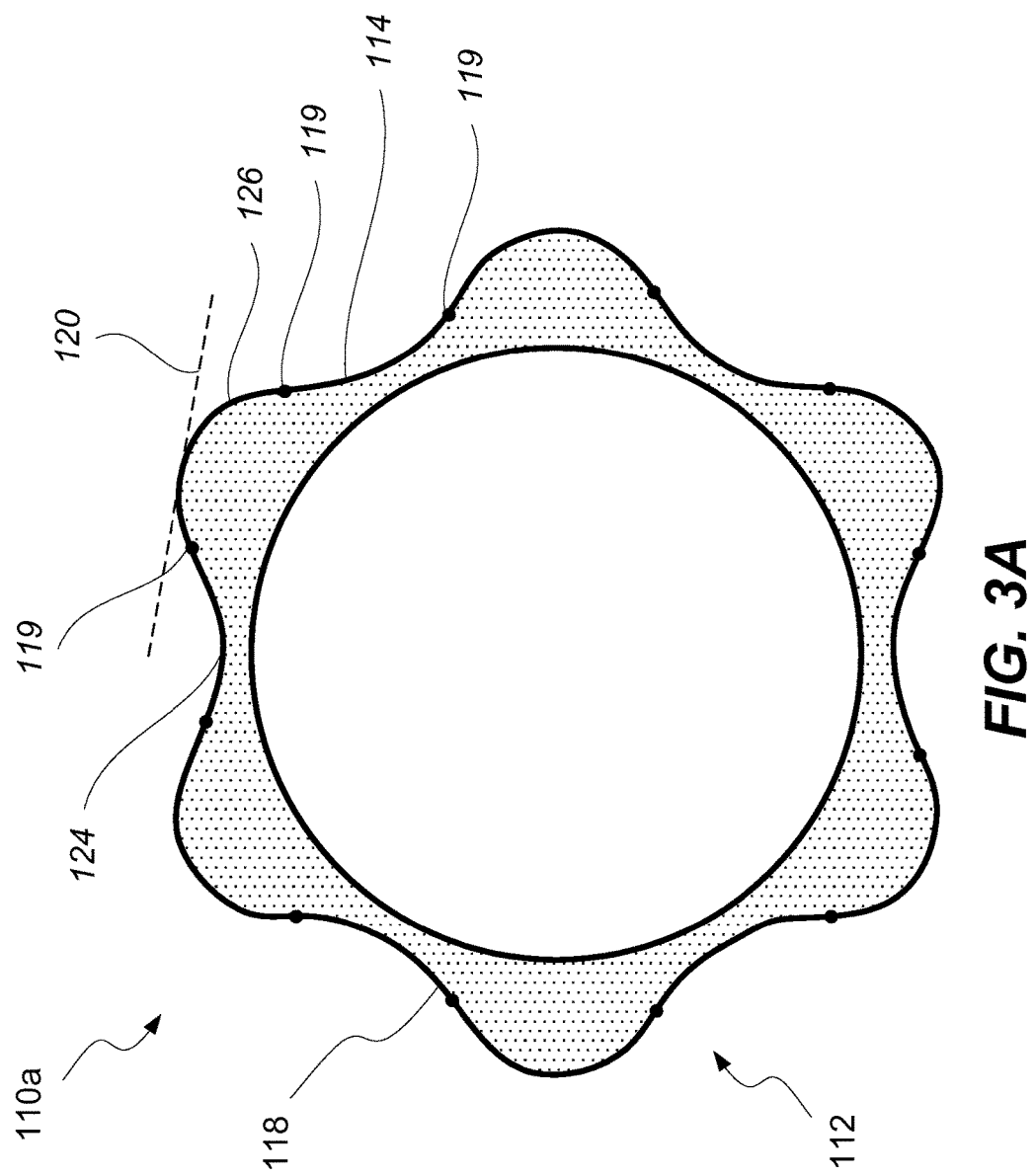

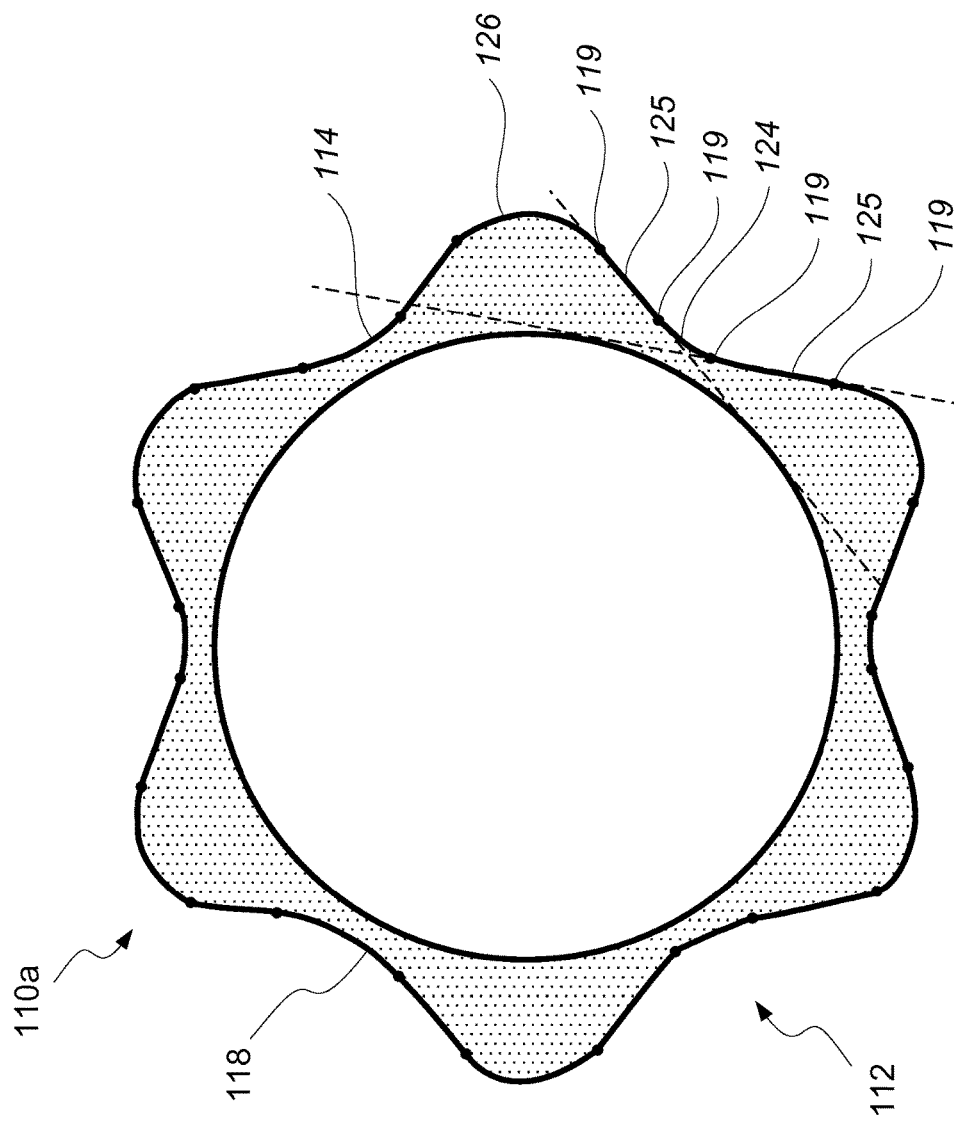

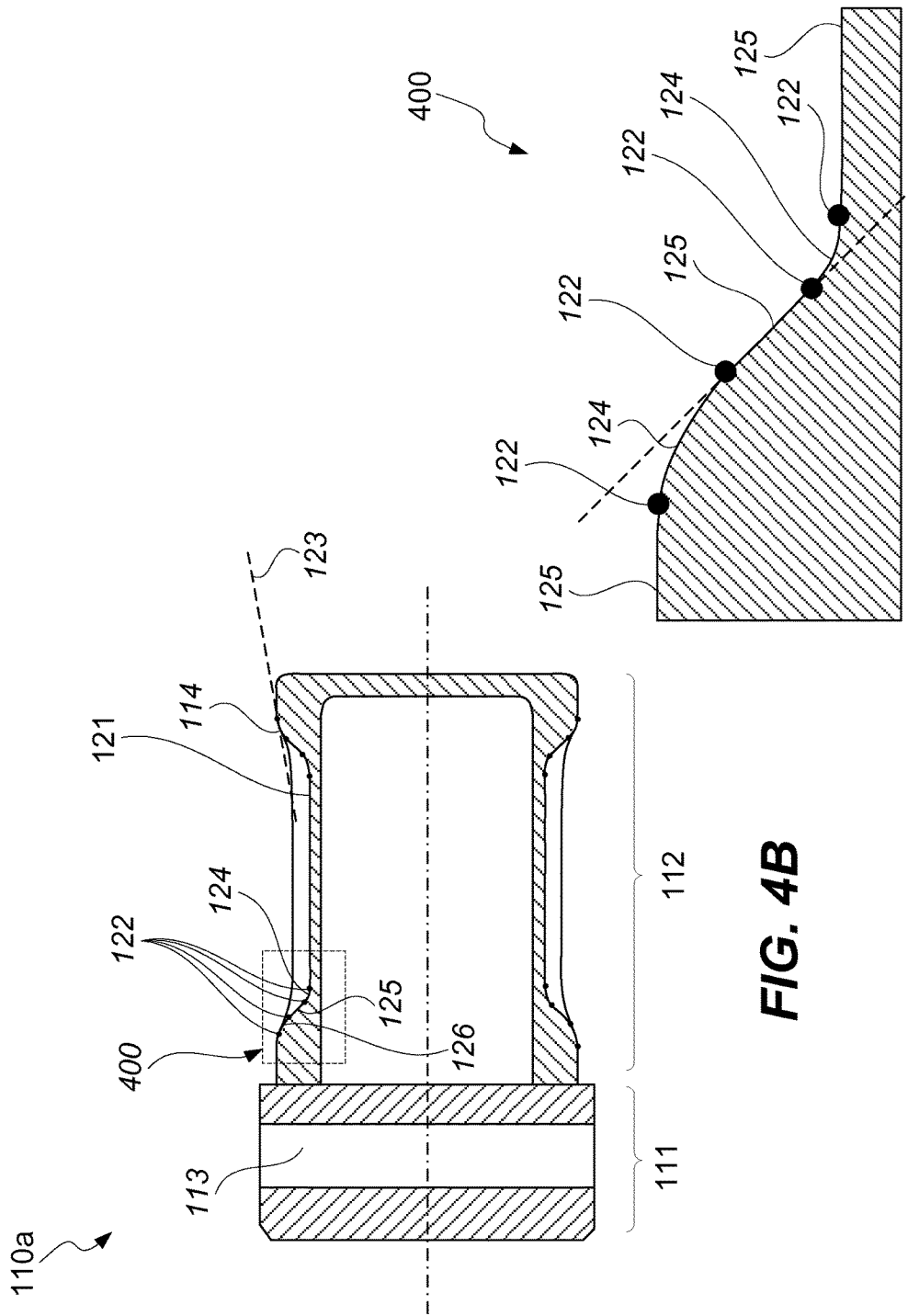

TORQUE TUBE MANUFACTURING METHODS

BACKGROUND

Torque tubes are typically used for transmitting power, e.g., from a drive unit to a driven unit. For example, a vehicle, such as an automobile, may utilize a torque tube for transferring power, e.g., from a transmission to a differential. In this application, a torque tube may be referred to as a propeller shaft or a drive shaft. In another example, a torque tube may be used in an aircraft control system for transmitting torsional forces to control surfaces, such as ailerons and flaps.

A typical torque tube is hollow and has an elongated shape. The torque tube may be made of aluminum or from other suitable materials capable of withstanding the torque transferred through the tube. During the manufacturing process, end fittings with outer surfaces having angular ridges are inserted into the ends of the torque tube. The ends of the tube are then conformed to (swaged over) the end fittings to form complementary geometric features on the inner surface of the tube for torque tube engaging the angular ridges of the end fittings. The above-described couplings prevent slippage of the end fittings with respect to the torque tube and transfer torsional loads between the end fittings and the tube section.

When a torque tube is conformed to end fittings configured as described above, the walls of the tube may become susceptible to cracking. These cracks may reduce the expected life of the tube and parts containing cracks should be removed from service.

SUMMARY

Accordingly, apparatus and method, intended to address the above-identified concerns, would find utility.

One aspect of the present disclosure relates to an apparatus comprising a first end fitting. The first end fitting comprises a tube engagement portion. The tube engagement portion comprises an outer coupling surface. The outer coupling surface comprises a first virtual cross-section. The first virtual cross-section comprises a first transverse inflection point. Each point along the virtual first cross-section has a first virtual tangent line coplanar with the first virtual cross-section.

One aspect of the present disclosure relates to a vehicle comprising an apparatus. The apparatus comprises a first end fitting comprising a tube engagement portion. The tube engagement portion comprises an outer coupling surface. All contours of the outer coupling surface are smooth. The outer coupling surface comprises at least one first concavity and at least one first convexity. The apparatus also comprises a second end fitting and a torque tube. The torque tube comprises a first end and a second end. The first end of the torque tube is coupled to the first end fitting. The second end of the torque tube is coupled to the second end fitting. The first end of the torque tube comprises an end fitting engagement portion. The end fitting engagement portion comprises an inner coupling surface conformed to the outer coupling surface of the tube engagement portion of the first end fitting. All contours of the inner coupling surface are smooth. The inner coupling surface comprises at least one second convexity complementary to the at least one first concavity of the outer coupling surface of the tube engagement portion. The inner coupling surface comprises at least one second concavity complementary to the at least one first convexity of the outer coupling surface of the tube engagement portion. The vehicle also comprises a drive unit coupled to the first end fitting and a driven unit coupled to the second end fitting.

One aspect of the present disclosure relates to a method for manufacturing the apparatus. The method comprises installing a protective sleeve over the end of the torque tube. The method also comprises installing a conductive sleeve over the protective sleeve. The method also comprises inserting the first end fitting into the end of the torque tube. The tube engagement portion of the first end fitting is inserted into the end of the torque tube during this operation. The tube engagement portion comprises the outer coupling surface. The method also comprises electromagnetically forming the end of the torque tube to conform the torque tube to the outer coupling surface of the first end fitting. The method further comprises removing the conductive sleeve and removing the protective sleeve.

BRIEF DESCRIPTION OF THE DRAWINGS

Figure 1:
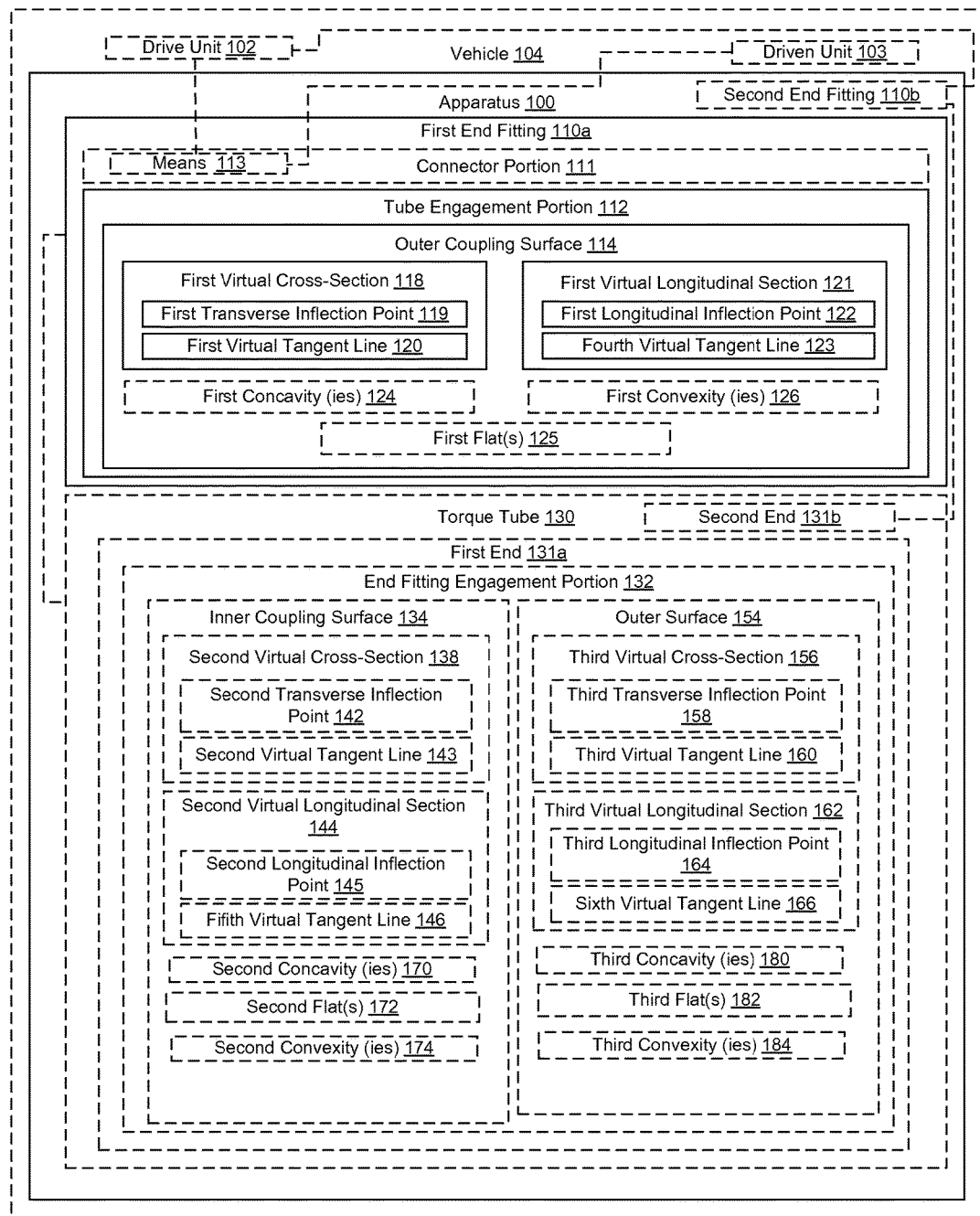
Figure 2A:
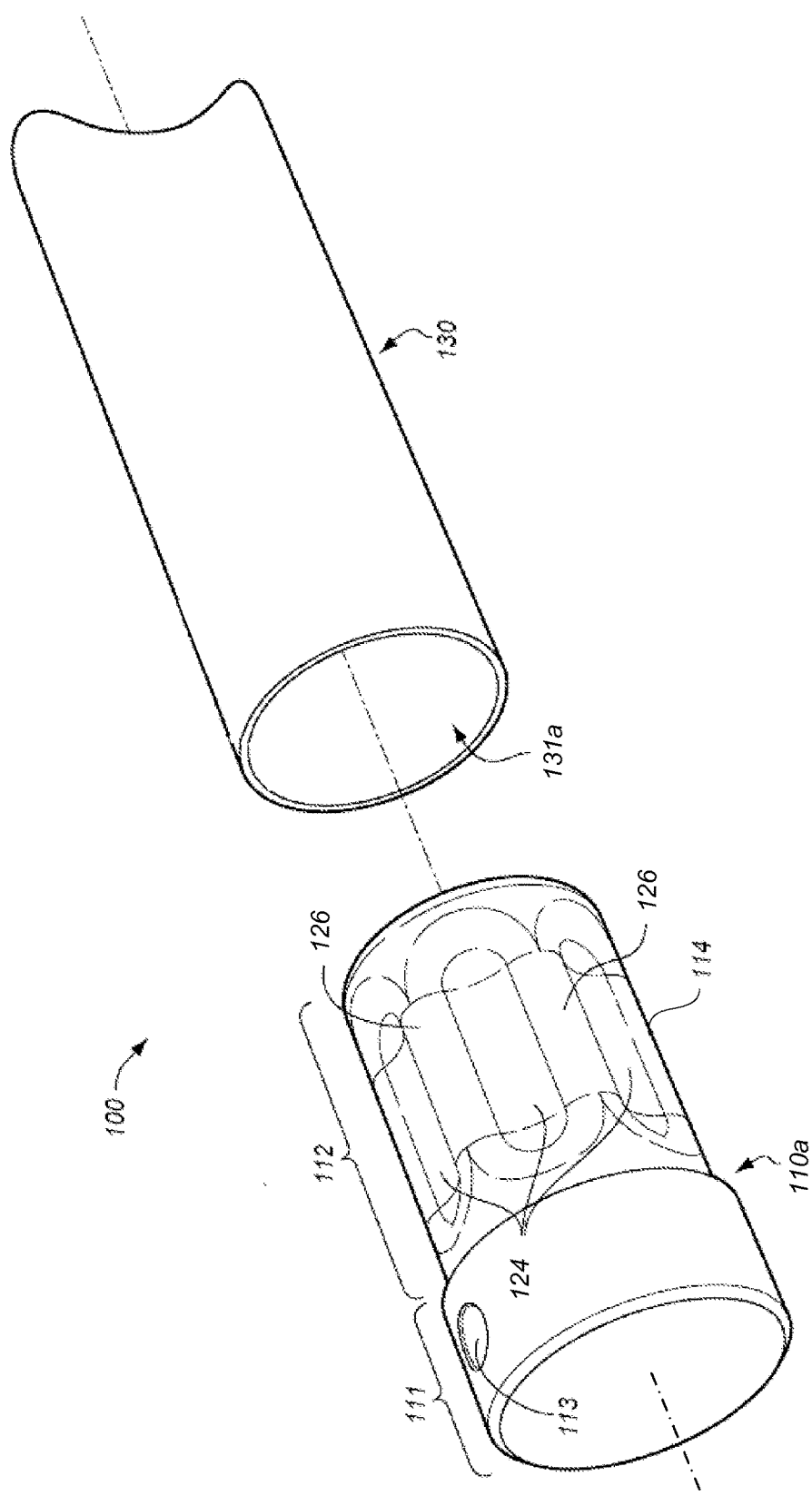
Figure 2B:
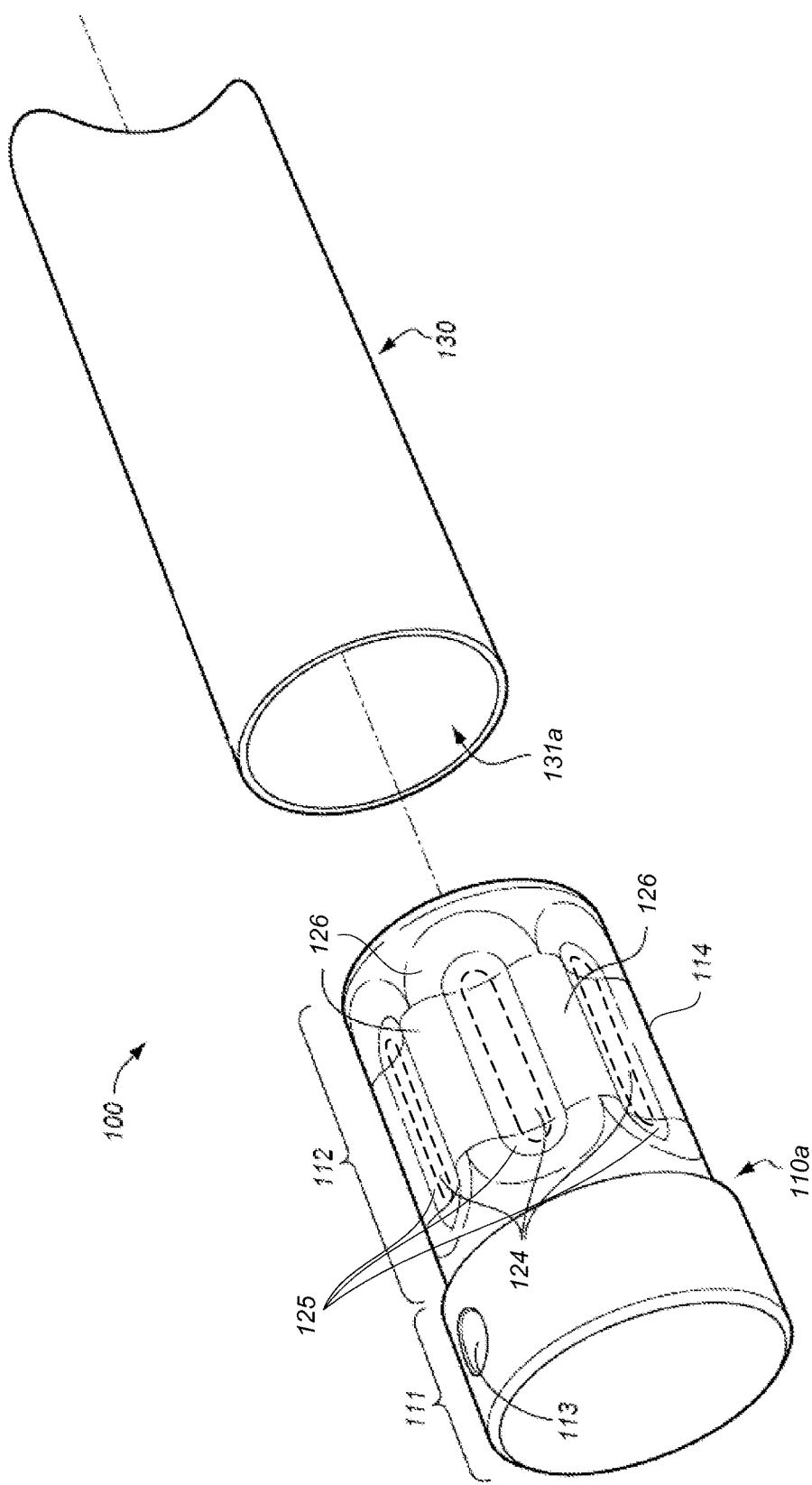
Figure 4A:
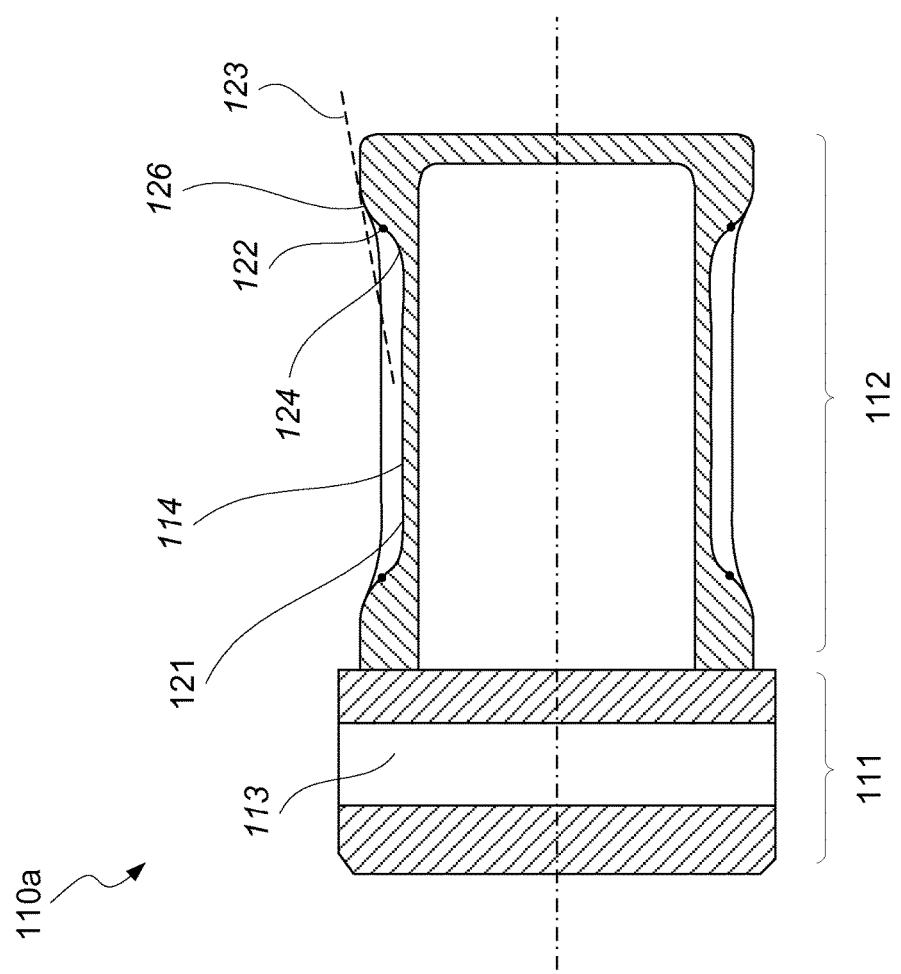
Figure 5:
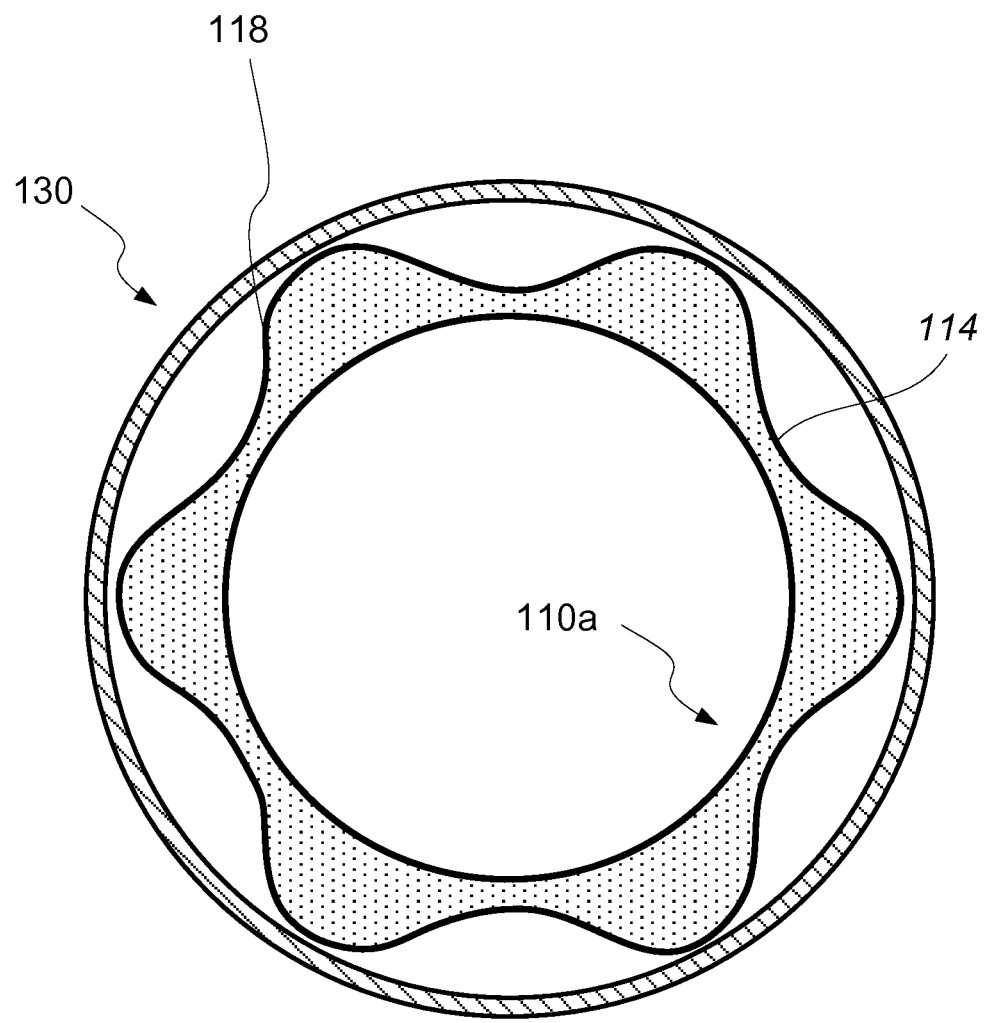
Figure 6A:
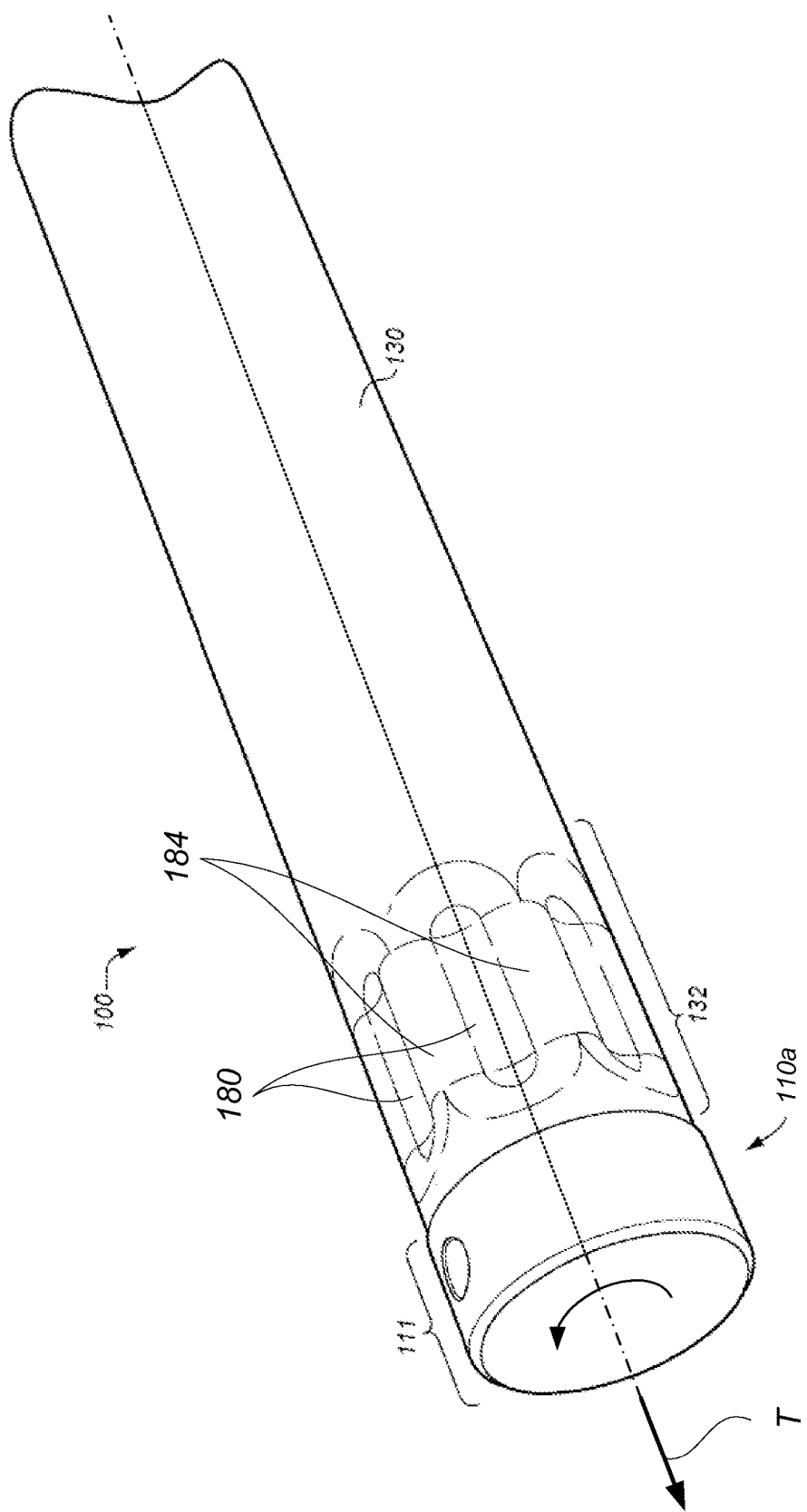
Figure 6B:
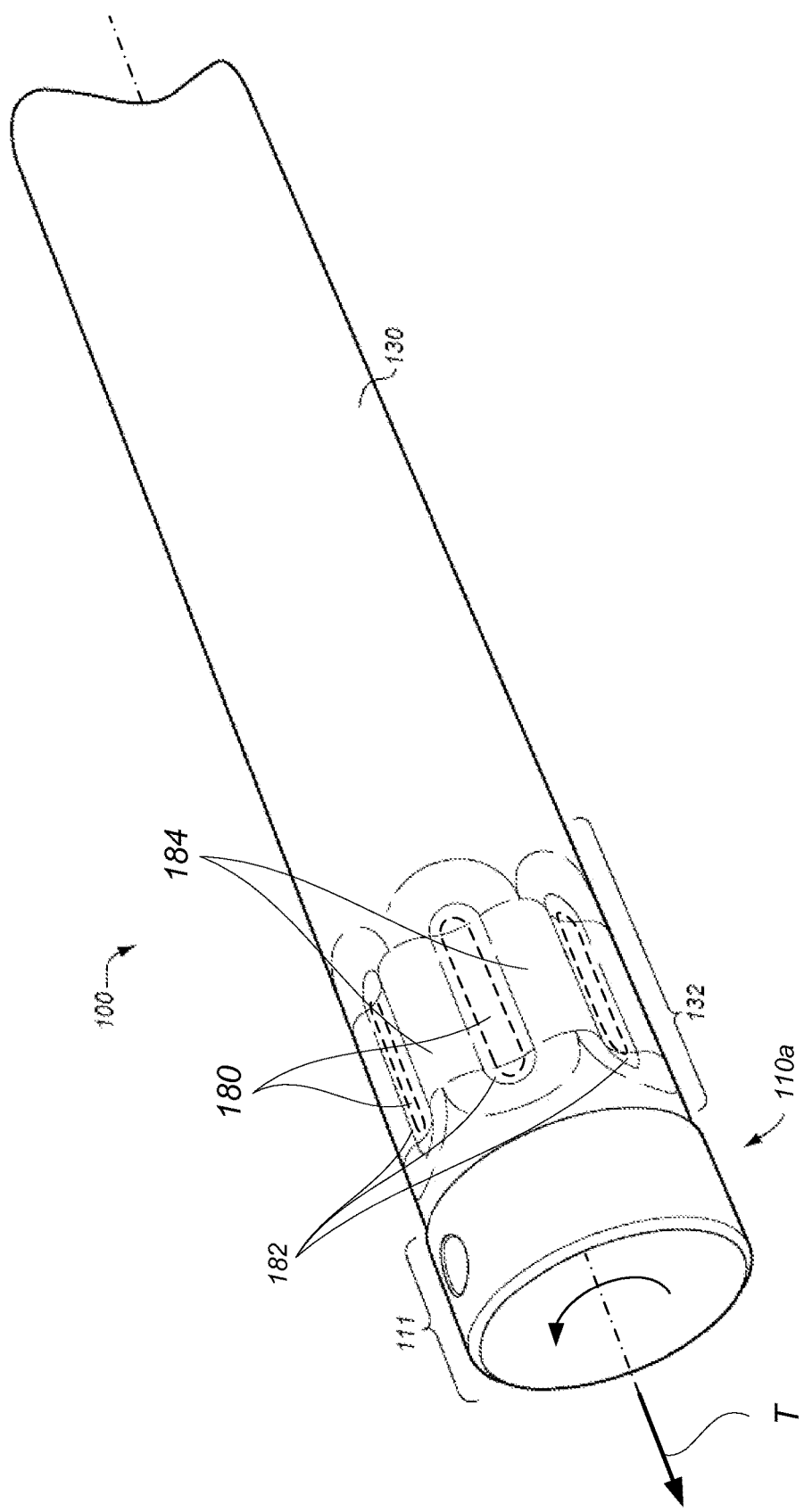
Figure 7A:
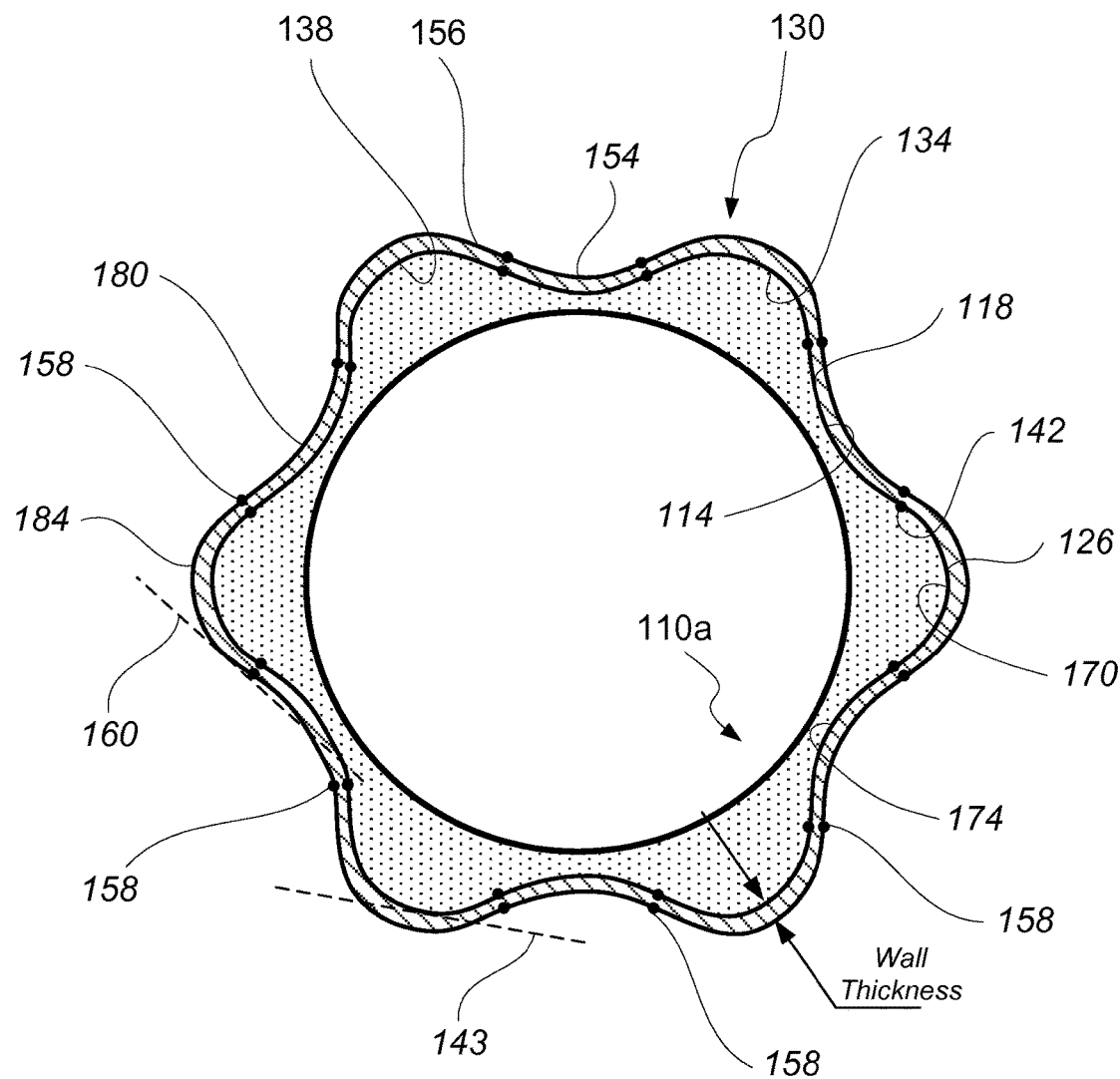
Figure 7B:
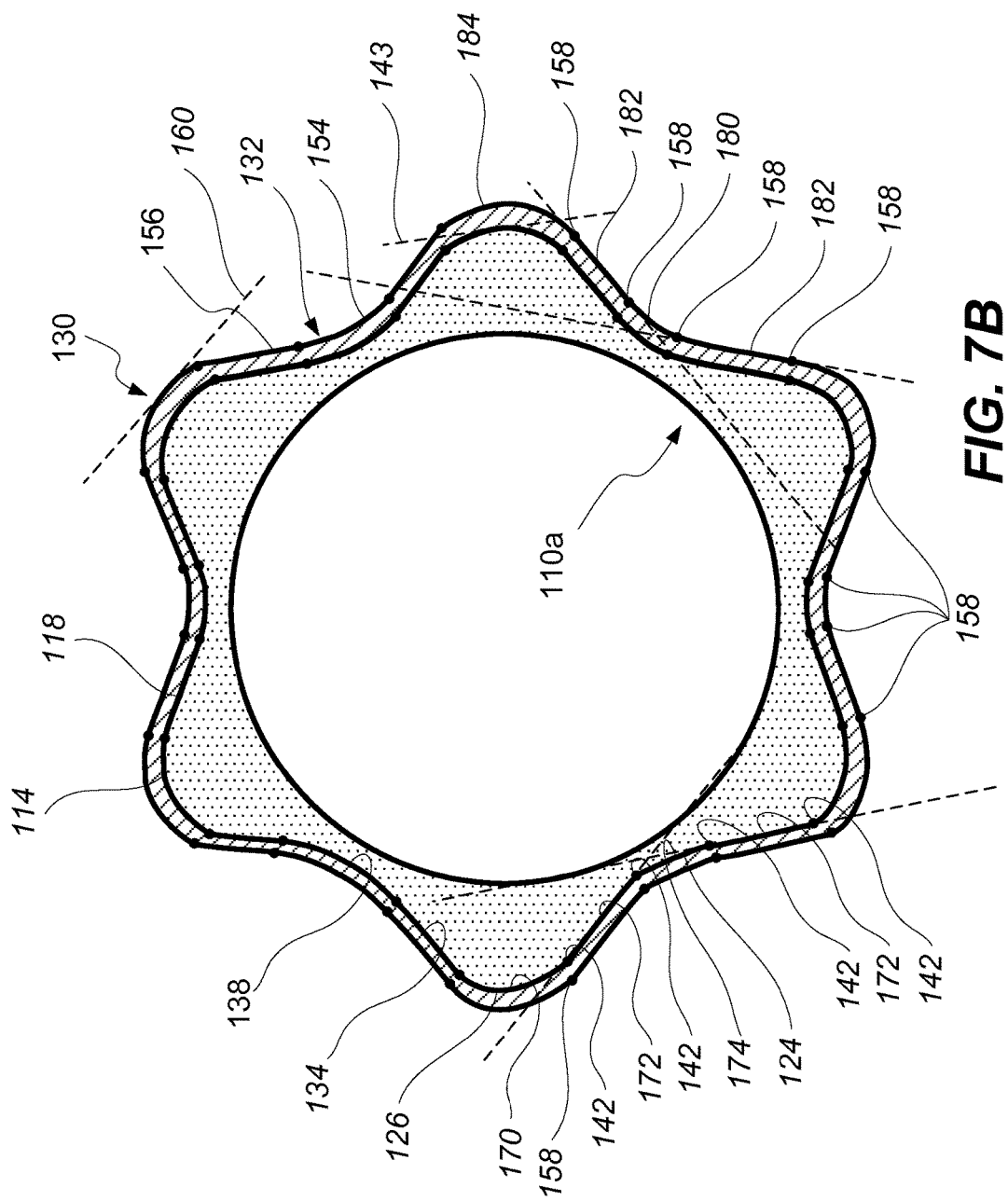
Figure 8:
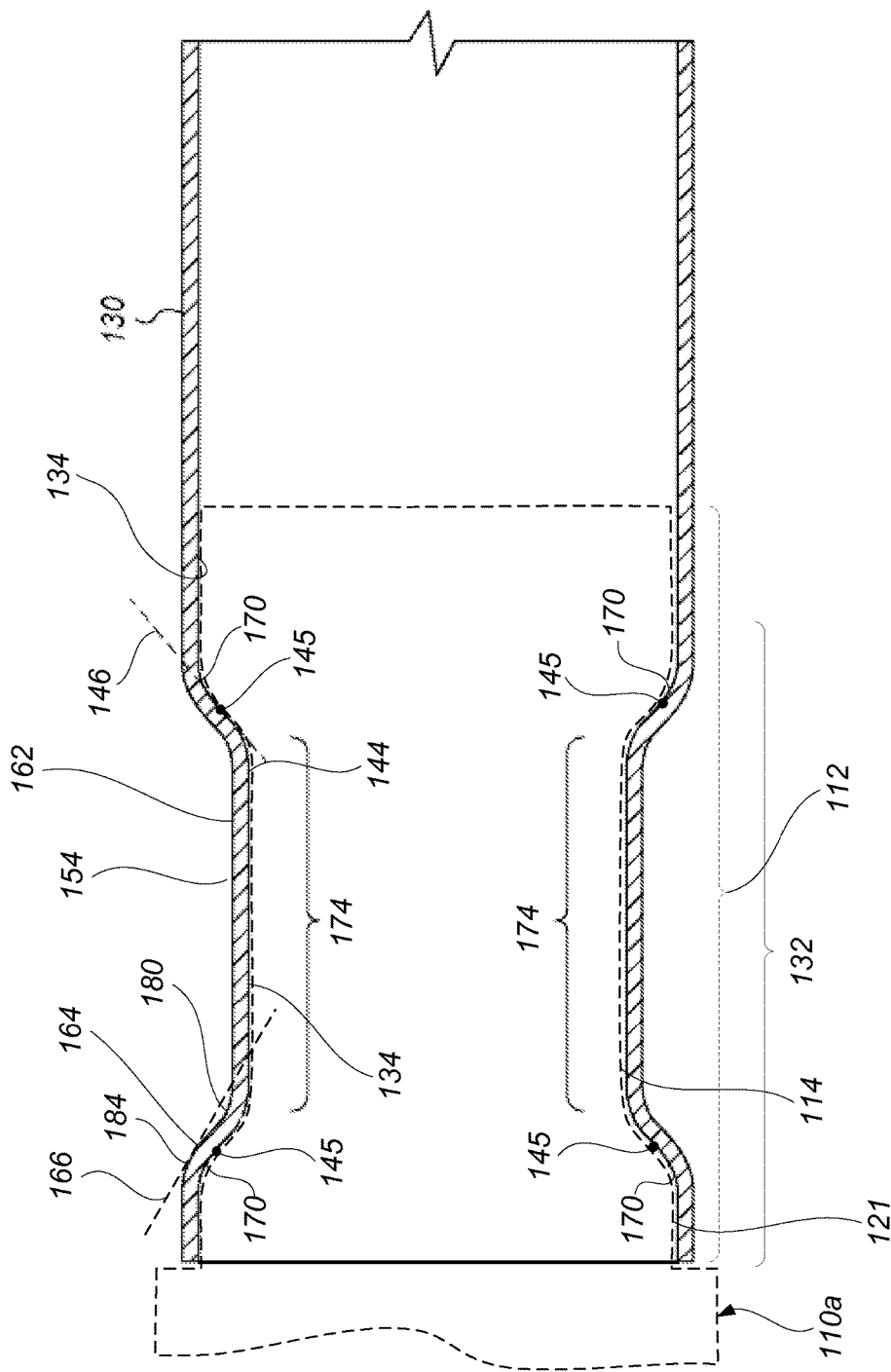
Figure 9:
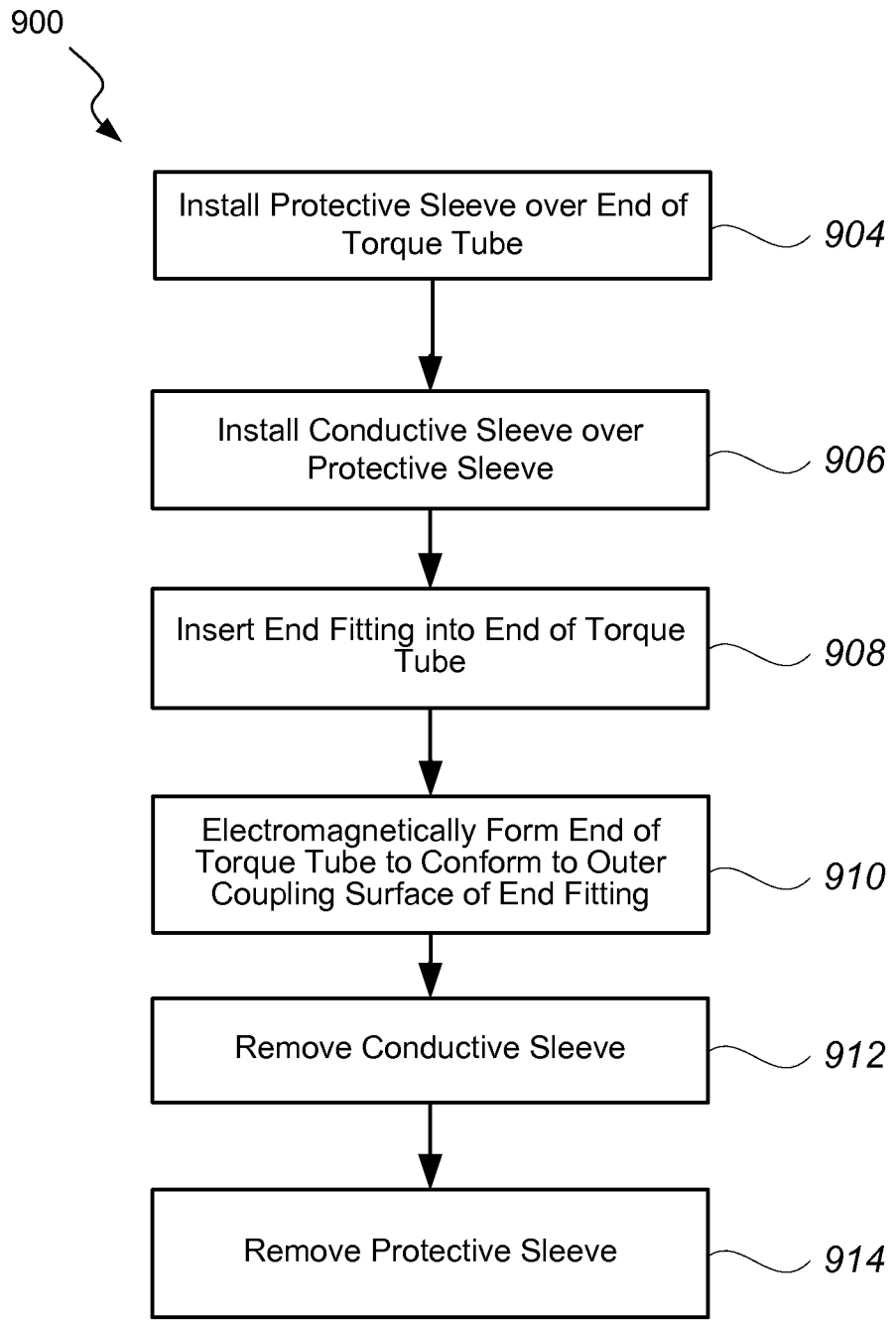
Figure 15:
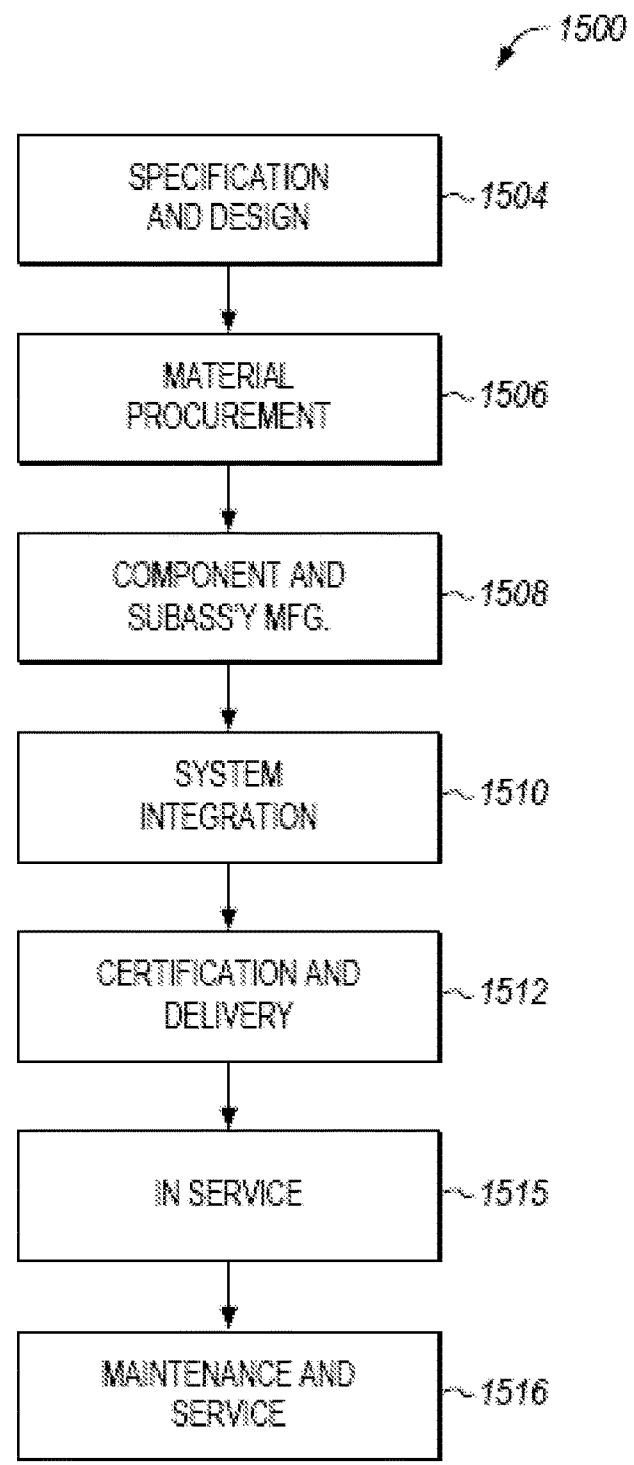
Figure 16:
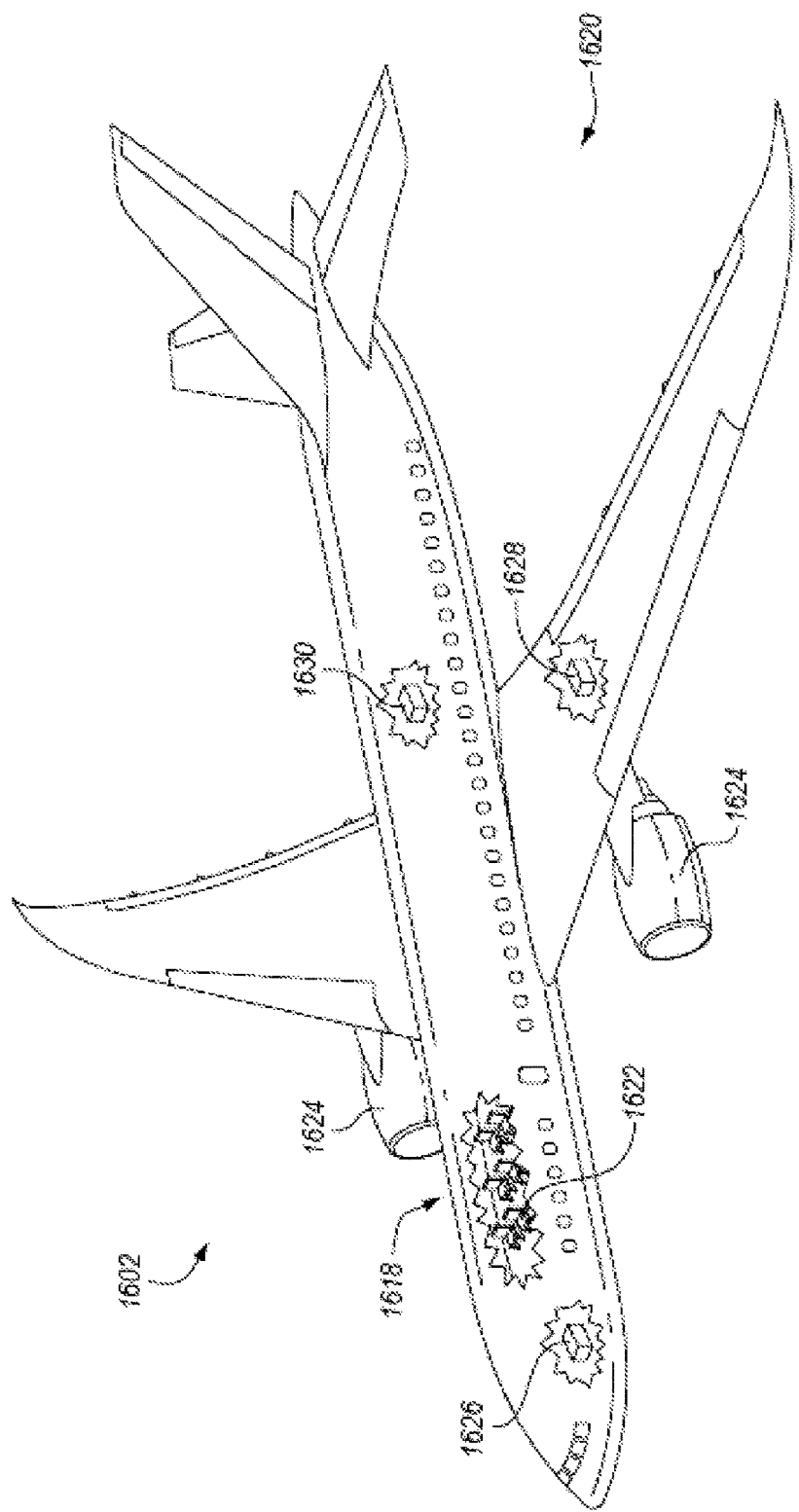

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of an apparatus, which may be a part of a vehicle and which comprises an end fitting and, optionally, a torque tube, according to one aspect of the present disclosure;

FIG. 2A is a schematic perspective view of the apparatus of FIG. 1 prior to inserting the end fitting into the torque tube, according to one aspect of the present disclosure;

FIG. 2B is a schematic perspective view of the apparatus of FIG. 1 prior to inserting the end fitting, which includes flats, into the torque tube, according to one aspect of the present disclosure;

FIG. 3A is a schematic cross-sectional view of an end fitting of FIGS. 1 and 2A, according to one aspect of the present disclosure;

FIG. 3B is a schematic cross-sectional view of an end fitting of FIGS. 1 and 2B including flats, according to one aspect of the present disclosure;

FIG. 4A is a schematic longitudinal sectional view of an end fitting of FIGS. 1 and 2A, according to one aspect of the present disclosure;

FIG. 4B is a schematic longitudinal sectional view of an end fitting of FIGS. 1 and 2B including flats, according to one aspect of the present disclosure;

FIG. 4C is a schematic detail view of a portion of the end fitting of FIG. 1 and FIG. 4B including flats, according to one aspect of the present disclosure;

FIG. 5 is a schematic cross-sectional view of the apparatus of FIG. 1 prior to forming the torque tube to conform to the end fitting, according to one aspect of the present disclosure;

FIG. 6A is a schematic perspective view of the apparatus of FIG. 1 after forming the torque tube to conform to the end fitting, according to one aspect of the present disclosure;

FIG. 6B is a schematic perspective view of the apparatus of FIG. 1 including flats after forming the torque tube to conform to the end fitting, according to one aspect of the present disclosure;

FIG. 7A is a schematic cross-sectional view of the apparatus of FIG. 1 after conforming the torque tube to the end fitting, according to one aspect of the present disclosure;

FIG. 7B is a schematic cross-sectional view of the apparatus of FIG. 1 including flats after conforming the torque tube to the end fitting, according to one aspect of the present disclosure;

FIG. 8 is a schematic longitudinal sectional view of the apparatus of FIG. 1 after conforming the torque tube to the end fitting, according to one aspect of the present disclosure;

FIG. 9 is a block diagram of a method of manufacturing the apparatus of FIG. 1, according to one aspect of the present disclosure;

FIGS. 10-14 are schematic perspective views of the apparatus of FIG. 1 at different stages of its manufacturing, according to one or more aspects of the present disclosure;

FIG. 15 is a block diagram of aircraft production and service methodology;

FIG. 16 is a schematic illustration of an aircraft.

In FIG. 1, above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships between the various disclosed elements are necessarily represented. Accordingly, couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the present disclosure. Likewise, elements and/or components, if any, represented with dashed lines, indicate alternative or optional aspects of the present disclosure. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In FIGS. 9 and 15, referred to above, the blocks may represent operations and/or portions thereof and lines connecting the various blocks do not imply any particular order or dependency of the operations or portions thereof. FIGS. 9 and 15 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific aspects and examples, it will be understood that these aspects and examples are not intended to be limiting.

Reference herein to "one aspect" or "one example" means that one or more feature, structure, or characteristic described in connection with the aspect or example is included in at least one implementation. The phrase "one aspect" or "one example" in various places in the specification may or may not be referring to the same aspect or example.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, any means-plus-function clause is to be interpreted under 35 U.S.C. 112(f), unless otherwise explicitly stated. It should be noted that examples provided herein of any structure, material, or act in support of any means-plus-function clause, and equivalents thereof, may be utilized individually or in combination. Thus, while various structures, materials, or acts may be described in connection with a means-plus-function clause, any combination thereof or of their equivalents is contemplated in support of such means-plus-function clause.

Referring generally to FIGS. 1-2B, and with particular reference to FIGS. 3A-3B, aspect 1 of the present disclosure relates to apparatus 100 comprising first end fitting 110a. First end fitting 110a comprises tube engagement portion 112. Tube engagement portion 112 comprises outer coupling surface 114. Outer coupling surface 114 comprises first virtual cross-section 118 (shown, e.g., in FIGS. 3A and 3B). First virtual cross-section 118 comprises first transverse inflection point 119. Each point along first virtual cross-section 118 has first virtual tangent line 120 coplanar with first virtual cross-section 118. As used herein, "virtual" means having the attributes of a feature without possessing its physical form. In some aspects, apparatus 100 includes other components, such as torque tube 130, further described below, and, in other aspects, apparatus 100 includes an additional end fitting, such as second end fitting 110b (shown, e.g., in FIG. 1), which is similar or identical to first end fitting 110a. In addition to tube engagement portion 112, in one aspect, first end fitting 110a includes connector portion 111 further describe below.

As shown, e.g., in FIGS. 3A and 3B, which illustrate first virtual cross-section 118, the presence of first virtual tangent line 120 at each point along first virtual cross-section 118 indicates that none of these points is a vertex of a corner. As used herein, a corner is considered to have a vertex when the corner radius is less than about 0.125 inches. This value may be used for torque tube 130 having an outside diameter of between about 1 inch and 2 inches or, more specifically, between about 1.25 inches and 1.5 inches. In general, a ratio of the outside diameter to the corner radius may be between about 5 and 20 such as about 10. In other words, each position of first virtual cross-section 118 has a curvature of at least about 0.125 inches. It should be noted that only virtual tangent lines that are coplanar with first virtual cross-section 118 are indicative of this feature. In other words, the shape of outer coupling surface 114 is analyzed within the plane defined by first virtual cross-section 118. Outer coupling surface 114 is represented by a smooth curve at first virtual cross-section 118. As such, outer coupling surface 114 does not have edges intersecting at least first virtual cross-section 118 that otherwise may cause cracking or some other damage to torque tube 130, particularly when torque tube 130 is electromagnetically formed over first end fitting 110a. It should be noted that during electromagnetic forming, inner coupling surface 134 of end fitting portion 132 of torque tube 130 conforms to outer coupling surface 114 of tube engagement portion 112 of first end fitting 110a. Therefore, the absence of sharp edges on outer coupling surface 114, as evident by the absence of the corner vertices in first virtual cross-section 118, reduces the risk of stress cracking in end fitting engagement portion 132.

The presence of first transverse inflection point 119 indicates that first virtual cross-section 118 of outer coupling surface 114 includes both convex and concave portions. For purposes of this disclosure, an inflection point is defined as a transition point between a concave portion and a convex portion, a concave portion and a flat portion, or a convex portion and a flat portion of a line representing first virtual cross-section 118. For purposes of this disclosure, first virtual cross-section 118 is perpendicular to the direction of the torque T transferred by apparatus 100, e.g., from drive unit 102 to driven unit 103 (FIG. 1). In the example shown in FIGS. 6A and 6B, the torque direction is substantially coaxial to the center axis of torque tube 130. As such, first virtual cross-section 118 of tube engagement portion 112 is distinguishable from other shapes without corner vertexes (as defined above), such as ovals or circles, having only convex portions.

In some aspects, first virtual cross-section 118 includes multiple first transverse inflection points 119. As an example, first virtual cross-section 118 includes at least two first transverse inflection points 119 wherein, first transverse inflection point 119 separates first concavity 124 from first convexity 126. For example, FIG. 3A illustrates first virtual cross-section 118 having twelve first transverse inflection points 119 separating six first concavities 124 from six first convexities 126 forming first virtual cross-section 118, according to one aspect of the disclosure. The number of first transverse inflection points 119 depends on the number of first concavities 124 and first convexities 126, which, in turn depends, at least in part, on the overall size (e.g., an outer diameter) of tube engagement portion 112, wall thickness of torque tube 130, material of torque tube 130, depth and/or curvature of first concavities 124 and first convexities 126, and/or other factors.

In some aspects, first transverse inflection point 119 may be positioned between first flat 125 and one of first concavity 124 and first convexity 126. This type of transverse inflection points should be distinguished from a transverse inflection point formed by a concavity and an adjacent convexity. For example, FIG. 3B illustrates first virtual cross-section 118 having twenty four first transverse inflection points 119 separating six first concavities 124 from twelve first flats 125 and also separating twelve first flats 125 from six first convexities 126. Specifically, each of twelve first flats 125 separate a pair of first concavity 124 and first convexity 126. Each end of each first flat 125 is defined by first transverse inflection point 119. In this example, each first concavity 124 is disposed between two first flats 125 and each first convexity 126 is disposed between two first flats 125. First transverse inflection point 119 define transitions from first flats 125 to first convexities 126 and first flats 125 to first concavities 124.

Referring, e.g., to FIGS. 1, 6A, 6B, 7A and 7B, aspect 2 of the present disclosure, which includes at least a portion of the subject matter of aspect 1 and may also include at least a portion of the subject matter of any other aspect or aspects disclosed herein, apparatus 100 comprises torque tube 130 coupled to first end fitting 110a. Torque tube 130 comprises end fitting engagement portion 132 conformed to tube engagement portion 112 of first end fitting 110a. End fitting engagement portion 132 comprises inner coupling surface 134. Inner coupling surface 134 comprises second virtual cross-section 138 (shown, e.g., in FIGS. 7A and 7B) coplanar with and complementary to first virtual cross-section 118 of outer coupling surface 114 of first end fitting 110a. Second virtual cross-section 138 comprises second transverse inflection point 142. Each point along second virtual cross-section 138 has second virtual tangent line 143 coplanar with second virtual cross-section 138. The presence of second virtual tangent line 143 at each point along second virtual cross-section 138 indicates that none of these points is a vertex of a corner. Second virtual cross-section 138 or, more specifically, a line representing second virtual cross-section 138, is a smooth curve. The shape of second virtual cross-section 138 is complementary to or, more specifically, conforms to the shape of first virtual cross-section 118. As noted above, end fitting engagement portion 132 of torque tube 130 conforms to tube engagement portion 112 of first end fitting 110a such that inner coupling surface 134 of end fitting engagement portion 132 is complementary to and conforms to outer coupling surface 114 of tube engagement portion 112. In one aspect, once apparatus 100 is assembled, inner coupling surface 134 substantially contacts outer coupling surface 114, providing engagement of first end fitting 110a and torque tube 130 and allowing torque transfer between first end fitting 110a and torque tube 130.

As further described below, end fitting engagement portion 132 of torque tube 130 is swaged onto or, more specifically, electromagnetically formed over tube engagement portion 112 of first end fitting 110a. In addition to contacting inner coupling surface 134, in one aspect, outer coupling surface 114 defines the shape of inner coupling surface 134. In one aspect, absence of corner vertexes along first virtual cross-section 118 results in a similar absence of corners vertexes along second virtual cross-section 138.

Second transverse inflection point 142 indicates that, similar to first virtual cross-section 118, second virtual cross-section 138 includes both convex and concave portions. In one aspect, second virtual cross-section 138 includes a plurality of second transverse inflection points 142. The number and location of second transverse inflection points 142 on second virtual cross-section 138 generally corresponds to the number and location of first transverse inflection points 119 on first virtual cross-section 118. The shapes of first virtual cross-section 118 and second virtual cross-section 138 conform to each other providing tight fit between tube engagement portion 112 of first end fitting 110a and end fitting engagement portion 132 of torque tube 130.

Referring e.g. to FIGS. 1, 7A and 7B, in aspect 3 of the present disclosure, which includes at least a portion of the subject matter of aspect 2 and may also include at least a portion of the subject matter of any other aspect or aspects disclosed herein, end fitting engagement portion 132 of torque tube 130 comprises outer surface 154. Outer surface 154 comprises third virtual cross-section 156 coplanar with second virtual cross-section 138 of inner coupling surface 134. Third virtual cross-section 156 comprises third transverse inflection point 158. Each point along third virtual cross-section 156 has third virtual tangent line 160 coplanar with third virtual cross-section 156. The presence of third virtual tangent line 160 at each point along third virtual cross-section 156 and the fact that each third virtual tangent line 160 is coplanar with third virtual cross-section 156 indicates that neither one of the points along third virtual cross-section 156 is a corner. Third virtual cross-section 156 is a smooth curve or, more specifically, a curve representing outer surface 154 at third virtual cross-section 156 is smooth and does not have corners. In fact, the separation between third virtual cross-section 156 corresponding to outer surface 154 and second virtual cross-section 138 corresponding to inner coupling surface 134 is set by the wall thickness of torque tube 130 at second virtual cross-section 138 and third virtual cross-section 156. In some example, the wall thickness is substantially uniform (e.g., varies by less than 25% or even by less than 10%) along third virtual cross-section 156 and second virtual cross-section 138. Changing (e.g., reducing) the wall thickness during forming of end fitting engagement portion 132 is generally undesirable in order to maintain structural integrity of end fitting engagement portion 132.

Referring e.g. to FIG. 1, in aspect 4 of the present disclosure, which includes at least a portion of the subject matter of any of aspects 2-3 and may also include at least a portion of the subject matter of any other aspect or aspects disclosed herein, torque tube 130 comprises titanium. Titanium has a high tensile strength to density ratio, high corrosion resistance, fatigue resistance, high crack resistance, and ability to withstand moderately high temperatures without creeping, which makes titanium and, more specifically, torque tube 130 comprising titanium particularly suitable for various applications, such as aircraft applications. Furthermore, fatigue resistance and high crack resistance make of titanium allows forming torque tube 130 into a particular shape over first end fitting 110a as, for example, shown in FIGS. 7A and 7B. This shape defined by third virtual cross-section 156 and second virtual cross-section 138 provides engagement between torque tube 130 and first end fitting 110a and allows torque transfer. The shape needs to be retained during operation of apparatus 100. In some embodiments, torque tube 130 comprises as an alloy of titanium. In one aspect, one or more other components of this alloy are aluminum, zirconium, nickel, vanadium, and various combinations thereof. A particular example is a Ti64 alloy which includes 6% aluminum, 4% vanadium, 0.25% (maximum) iron, 0.2% (maximum) oxygen, and the remainder titanium. Mechanical properties of titanium allow forming much thinner torque tube 130 than when aluminum is used, for example, resulting in weight savings. In general, other materials such as steel, copper, and aluminum, can be used to torque tube 130. Corrosion resistance steel, such as stainless steel, can be used for first end fitting 110a.

Referring e.g. to FIGS. 1, 7A and 7B, in aspect 5 of the present disclosure, which includes at least a portion of the subject matter of any of aspects 2-4 and may also include at least a portion of the subject matter of any other aspect or aspects disclosed herein, torque tube 130 has a wall thickness between about 0.02 and about 0.08 inches or, more specifically, between about 0.04 and about 0.06 inches. In some aspects, smaller wall thicknesses are not be suitable for torque transfer applications since torque tube 130 can collapse when an excessive torque is applied to torque tube 130. As such, the torque transfer rating of torque tube 130 is one factor in selecting the wall thickness of the torque tube. At the same time, torque tube 130 having larger thicknesses may be too heavy for some applications (e.g., aircraft) and/or too difficult to form over first end fitting 110a. The wall thickness values presented above may be used for torque tube 130 having an outside diameter of between 1 inch and 1.5 inches. In addition the outside diameter, another parameter that may influence the wall thickness selection is the minimum corner radius described above to reduce the risk of cracking during forming as well as torque transfer. For purposes of this disclosure, the values of the wall thickness refer to the average value of the wall thickness along second virtual cross-section 138 and third virtual cross-section 156 as well as along second virtual longitudinal section 144 and third virtual longitudinal section 162.

Referring e.g. to FIGS. 1, 7A and 7B, in one example of the present disclosure, which may include at least a portion of the subject matter of any other aspect(s) and/or example(s) disclosed herein, torque tube 130 has an outside diameter between about 0.50 inches and about 4.00 inches or, more specifically, between about 1.0 inch and about 2.0 inches. For purposes of this disclosure, the values of the outside diameter refer to the outside diameter of a portion of torque tube 130 that is not formed or, more specifically, is not a part of end fitting engagement portion 132. In general, the outside diameter of torque tube 130 depends on the wall thickness as described above. In some examples (when torque tube 130 snugly fits over first end fitting 110a prior to forming and when end fitting engagement portion 132 comprises an even number of second concavities 170 uniformly spaced apart), the distance between the tips of two second concavities 170 disposed diametrically opposite from each other along the second virtual cross-section 138 is the same as the outside diameter.

Referring e.g. to FIGS. 1, 2A, 2B, 4A and 4B in aspect 6 of the present disclosure, which includes at least a portion of the subject matter of any of aspects 1-5 and may also include at least a portion of the subject matter of any other aspect or aspects disclosed herein, first end fitting 110a comprises connector portion 111 adjacent tube engagement portion 112. Connector portion 111 comprises means 113 for connecting apparatus 100 to one of drive unit 102 or driven unit 103. While FIG. 1 illustrates that means 113 is connected to drive unit 102, one having ordinary skills in the art would understand that means 113 can be connected to either one of drive unit 102 or driven unit 103. In one example, means 113 is an opening for receiving a pin such that a portion of the pin extends into drive unit 102 or driven unit 103. In another aspect, means 113 is a spline having ridges or teeth on connector portion 111 that mesh with grooves of drive unit 102 or driven unit 103. Examples of spline types includes parallel key splines, involute splines, crowned splines, serrations, helical splines, and ball splines.

Referring e.g. to FIGS. 1 and 4A-4B, in aspect 7 of the present disclosure, which includes at least a portion of the subject matter of any of aspects 1-6 and may also include at least a portion of the subject matter of any other aspect or aspects disclosed herein, outer coupling surface 114 of tube engagement portion 112 of first end fitting 110a comprises first virtual longitudinal section 121. First virtual longitudinal section 121 comprises first longitudinal inflection point 122. Each point along first virtual longitudinal section 121 has fourth virtual tangent line 123 coplanar with first virtual longitudinal section 121. The presence of fourth virtual tangent line 123 at each point along first virtual longitudinal section 121 indicates that neither one of these points is a vertex of a corner. First virtual longitudinal section 121 of outer coupling surface 114 is smooth curve and does not have vertices of corners. As such, outer coupling surface 114 does not have edges intersecting at least first virtual longitudinal section 121 that otherwise may cause cracking of or may damage torque tube 130, particularly, when torque tube 130 is formed over first end fitting 110a. It should be noted that other portions of first end fitting 110*a* that do not include outer coupling surface and that are not used to form torque tube 130, such as connector portion 111, have one or more corner vertices in some aspects. Specifically, in one aspect, first end fitting 110*a* includes at least one corner vertex outside of the outer coupling surface 114. However, these corners do not have impact forming of torque tube 130. First longitudinal inflection point 122 indicates that first virtual longitudinal section 121 includes both convex and concave portions. As shown in FIGS. 4A-4B, first virtual longitudinal section 121 includes two first convexities 126 and two first concavities 124.

Referring generally e.g. to FIGS. 1, 2A, 2B, 6A, 6B, 7A, 7B, and 8 and, more specifically, to FIG. 8, in aspect 8 of the present disclosure, which includes at least a portion of the subject matter of aspect 7 and may also include at least a portion of the subject matter of any other aspect or aspects disclosed herein, apparatus 100 comprises torque tube 130 coupled to first end fitting 110*a*. Torque tube 130 comprises end fitting engagement portion 132 conformed to tube engagement portion 112 of first end fitting 110*a*. End fitting engagement portion 132 comprises inner coupling surface 134. Inner coupling surface 134 comprises second virtual longitudinal section 144 coplanar with and complementary to first virtual longitudinal section 121 of outer coupling surface 114 of tube engagement portion 112. Second virtual longitudinal section 144 comprises second longitudinal inflection point 145. Each point along second virtual longitudinal section 144 has fifth virtual tangent line 146 coplanar with second virtual longitudinal section 144. As shown in FIG. 8, the presence of fifth virtual tangent line 146 at each point along second virtual longitudinal section 144 indicates that neither one of these points is a vertex of a corner. Second virtual longitudinal section 144 is a smooth curve. As such, inner coupling surface 134 does not have edges passing though second virtual longitudinal section 144 that otherwise may cause cracking or, more generally, may damage torque tube 130. Second longitudinal inflection point 145 indicates that second virtual longitudinal section 144 includes both convex and concave portions. As shown in FIG. 8, second virtual longitudinal section 144 includes two second convexities 174 and two second concavities 170. Furthermore, in one aspect, inner coupling surface 134 of tube engagement portion 112 has the same shape and generally conforms to outer coupling surface 114 of tube engagement portion 112 of first end fitting 110*a*. In fact, as further described below, tube engagement portion 112 may serve as a forming template during electromagnetic forming of tube engagement portion 112. During this operation, tube engagement portion 112 is deformed toward outer coupling surface 114 of tube engagement portion 112 until inner coupling surface 134 of tube engagement portion 112 conforms to outer coupling surface 114 of tube engagement portion 112.

Referring generally e.g. to FIGS. 1, 2A, 2B, 6A, 6B, 7A, 7B, and 8 and, more specifically, to FIG. 8, in aspect 9 of the present disclosure, which includes at least a portion of the subject matter of aspect 8 and may also include at least a portion of the subject matter of any other aspect or aspects disclosed herein, end fitting engagement portion 132 comprises outer surface 154. Outer surface 154 comprises third virtual longitudinal section 162 coplanar with second virtual longitudinal section 144. Third virtual longitudinal section 162 comprises third longitudinal inflection point 164. Each point along third virtual longitudinal section 162 has sixth virtual tangent line 166 coplanar with third virtual longitudinal section 162. It should be noted that FIG. 8 illustrates both second virtual longitudinal section 144 and third virtual longitudinal section 162 of torque tube 130. Second virtual longitudinal section 144 is described above with reference to inner coupling surface 134 and its features. Third virtual longitudinal section 162 will now be described with reference to outer surface 154. The correspondence of second virtual longitudinal section 144 and third virtual longitudinal section 162 comes from the fact that inner coupling surface 134 and outer surface 154 and only separated by the wall thickness of torque tube 130.

As shown in FIG. 8, the presence of sixth virtual tangent line 166 at each point along third virtual longitudinal section 162 indicates that neither one of these points is a corner vertex. A line corresponding to outer surface 154 in third virtual longitudinal section 162 is a smooth curve. As such, outer surface 154 does not have edges passing through third virtual longitudinal section 162 that otherwise may cause cracking or, more generally, may damage torque tube 130. Third longitudinal inflection point 164 indicates that third virtual longitudinal section 162 includes both convex and concave portions. As shown in FIG. 8, third virtual longitudinal section 162 includes two third convexities 184 and two third concavities 180.

Referring generally to FIGS. 2A-8, and with particular reference to FIG. 1, aspect 10 of the present disclosure relates to vehicle 104 comprising apparatus 100. Apparatus 100 comprises first end fitting 110*a* comprising tube engagement portion 112. Tube engagement portion 112 comprises outer coupling surface 114. All contours of outer coupling surface 114 are smooth. Outer coupling surface 114 comprises at least one first concavity 124 and at least one first convexity 126. Apparatus 100 also comprises second end fitting 110*b* and torque tube 130 comprising first end 131*a* and second end 131*b*. First end 131*a* of torque tube 130 is coupled to first end fitting 110*a*. Second end 131*b* of torque tube 130 is coupled to second end fitting 110*b*. First end 131*a* of torque tube 130 comprises end fitting engagement portion 132. End fitting engagement portion 132 comprises inner coupling surface 134 conformed to outer coupling surface 114 of tube engagement portion 112 of first end fitting 110*a*. All contours of inner coupling surface 134 are smooth. Inner coupling surface 134 comprises at least one second convexity 174 complementary to at least one first concavity 124 of outer coupling surface 114 of tube engagement portion 112. Inner coupling surface 134 comprises at least one second concavity 170 complementary to at least one first convexity 126 of outer coupling surface 114 of tube engagement portion 112. Vehicle 104 also comprises drive unit 102 coupled to first end fitting 110*a* and driven unit 103 coupled to second end fitting 110*b*. In one aspect, vehicle 104 is an aircraft or any other type of vehicles that use torque tube 130 to transfer torque from drive unit 102 to driven unit 103. More specifically, drive unit 102 is coupled to first end fitting 110*a*, which is coupled to first end 131*a* of torque tube 130. Driven unit 103 is coupled to second end fitting 110*b*, which is coupled to second end 131*b* of torque tube 130. In some examples, second end fitting 110*b* is the same as first end fitting 110*a*.

Outer coupling surface 114 of tube engagement portion 112 is shown in FIGS. 3A-3B and 4A-4B. Specifically, first concavity 124 and first convexity 126 are shown in two different sectional views, i.e., as a part of first virtual cross-section 118 in FIGS. 3A-3B and as a part of first virtual longitudinal section 121 in FIGS. 4A-4B. In both of these figures, first concavity 124 and first convexity 126 are represented by smooth curves that do not have any corner vertices. This aspect is described above with respect to first virtual tangent lines 120 and fourth virtual tangent lines 123. Furthermore, this aspect demonstrates, at least in part, that all contours of outer coupling surface 114 are smooth.

Inner coupling surface 134 of torque tube 130 is shown in FIGS. 7A, 7B, and 8. Specifically, second concavity 170 and second convexity 174 are shown in two different sectional views, i.e., as a part of first virtual cross-section 138 in FIGS. 7A and 7B and as a part of second virtual longitudinal section 144 in FIG. 8. In both of these figures, second concavity 170 and second convexity 174 are represented by smooth curves that do not have any corner vertices. This aspect is described above with respect to second virtual tangent lines 143 and fifth virtual tangent lines 146. Furthermore, this aspect demonstrates, at least in part, that all contours of inner coupling surface 134 are smooth.

Referring e.g. to FIGS. 1, 7A, 7B, and 8, in aspect 11 of the present disclosure, which includes at least a portion of the subject matter of aspect 10 and may also include at least a portion of the subject matter of any other aspect or aspects disclosed herein, end fitting engagement portion 132 of torque tube 130 comprises outer surface 154. Outer surface 154 comprises at least one third concavity 180 and at least one third convexity 184. All contours of outer surface 154 are smooth. Outer surface 154 of torque tube 130 is shown in FIGS. 7A, 7B, and 8. Specifically, third concavity 180 and third convexity 184 are shown in two different sectional views, i.e., as a part of third virtual cross-section 156 in FIGS. 7A and 7B and as a part of third virtual longitudinal section 162 in FIG. 8. In both of these figures, third concavity 180 and third convexity 184 are represented by smooth curves that do not have any corner vertices. This aspect is described above with respect to third virtual tangent lines 160 and sixth virtual tangent lines 166. Furthermore, this aspect demonstrates, at least in part, that all contours of outer surface 154 are smooth.

Referring e.g. to FIG. 1 and particularly to FIG. 7B, in aspect 12 of the disclosure, which includes at least a portion of the subject matter of aspect 11 and may additionally include at least a portion of the subject matter of any other aspect or aspects disclosed herein, inner coupling surface 134 comprises at least one second flat 172. One or more second flats 172 may be complimentary to one or more first flats 125 of outer coupling surface 114 of tube engagement portion 112 of first end fitting 110a. In one aspect, the number of second flats 172 is the same as the number of first flats 125. Alternatively, the number of second flats 172 is different than the number of first flats 125. For example, inner coupling surface 134 may not fully conform to outer coupling surface 114 such that one or more portions of inner coupling surface 134 may not contact outer coupling surface 114. In some embodiments, these portions may include one or more second flats 172. Second flat 172 is positioned between two second transverse inflection points 142, between two second longitudinal inflection points 145, or both sets of points. One end of second flat 172 (e.g., second transverse inflection point 142 and/or second longitudinal inflection points 145) may be also an end of second concavity 170. The other end of second flat 172 (e.g., second transverse inflection point 142 and/or second longitudinal inflection points 145) may be also an end of second convexity 174. As such, second flat 172 may be disposed between second concavity 170 and second convexity 174. In some aspects, second flat 172 may be disposed between two second concavities 170 or between two second convexities 174.

Referring e.g. to FIGS. 1, 7A, 7B, and 8, in aspect 13 of the present disclosure, which includes at least a portion of the subject matter of aspect 11 and may also include at least a portion of the subject matter of any other aspect or aspects disclosed herein, at least one third concavity 180 comprises a smallest radius of curvature of between about 0.125 inches and about 0.5 inches for first end fitting 110a having an outside diameter of between 1 inch and 4 inches. In general, the radius of curvature is scalable with the outside diameter and the ratio of the outside diameter to the radius of curvature of first end fitting 110a may be between about 1 and 20 or, more specifically, between about 4 and 15, such as about 8.

Referring e.g. to FIGS. 1 and 2B and particularly to FIG. 3B, in aspect 14 of the present disclosure, which includes at least a portion of the subject matter of any of aspects 10-13 and may also include at least a portion of the subject matter of any of other aspect or aspects disclosed herein, outer coupling surface 114 of tube engagement portion 112 of first end fitting 110a comprises at least one first flat 125. Each first flat 125 is positioned between two first transverse inflection points 119, between two first longitudinal inflection points 122, or both sets of points. One end of first flat 125 (e.g., first transverse inflection point 119 and/or first longitudinal inflection points 122) may be also an end of first concavity 124. The other end (e.g., first transverse inflection point 119 and/or first longitudinal inflection points 122) may be formed also an end of first convexity 126. As such, first flat 125 may be disposed between first concavity 124 and first convexity 126 as shown in FIG. 3B. Specifically, FIG. 3B illustrates twelve first flats 125 separating six first concavities 124 and six first convexities 126. In some aspects, first flat 125 may be disposed between two first concavities 124 or between two first convexities 126. First flat 125 may be a part of first virtual cross-section 118 (as shown in FIG. 3B), first virtual longitudinal section 118 (as shown in FIGS. 4B and 4C), or both.

Referring e.g. to FIG. 1 and particularly to FIGS. 6B and 7B in aspect 15 of the present disclosure, which includes at least a portion of the subject matter of any of aspects 10-14 and may also include at least a portion of the subject matter of any other aspect or aspects disclosed herein, outer surface 154 of end fitting engagement portion 132 of torque tube 130 comprises at least one third flat 182. One or more third flats 182 may be complimentary to one or more first flats 125 of outer coupling surface 114 of tube engagement portion 112 of first end fitting 110a. In one aspect, the number of third flats 182 is the same as the number of first flats 125. Alternatively, the number of third flats 182 is different than the number of first flats 125. For example, inner coupling surface 134 may not fully conform to outer coupling surface 114 such that one or more portions of inner coupling surface 134 may not contact outer coupling surface 114. In some embodiments, these portions may include one or more third flats 182. Furthermore, in some aspect, end fitting engagement portion 132 has substantially uniform wall thickness and each of third flats 182 is complimentary to one of second flats 172.

Third flat 182 is positioned between two third transverse inflection points 158, between two third longitudinal inflection points 164, or both sets of points. One end of third flat 182 (e.g., third transverse inflection point 158 and/or third longitudinal inflection points 164) may be also an end of third concavity 180. The other end of third flat 182 (e.g., third transverse inflection point 158 and/or third longitudinal inflection points 164) may be also an end of third convexity 184. As such, third flat 182 may be disposed between third concavity 180 and third convexity 184. In some aspects, third flat 182 may be disposed between two third concavities 180 or between two third convexities 184.

Referring generally to FIGS. 10-14 and particularly to FIG. 9, aspect 16 of the present disclosure relates to method 900 for manufacturing apparatus 100. Method 900 comprises installing protective sleeve 1030 over first end 131*a* of torque tube 130 (block 904) as shown, for example, in FIG. 10. Method 900 also comprises installing conductive sleeve 1130 over protective sleeve 1030 (block 906), as shown, for example, in FIG. 11. Method 900 also comprises inserting first end fitting 110*a* into end 131*a* of torque tube 130 (block 908), as shown, for example, in FIG. 12. Tube engagement portion 112 of first end fitting 110*a* is inserted into end 131*a* of torque tube 130 during this operation. Tube engagement portion 112 comprises outer coupling surface 114. Method 900 also comprises electromagnetically forming first end 131*a* of torque tube 130 to conform torque tube 130 to outer coupling surface 114 of first end fitting 110*a* (block 910), as shown, for example, in FIG. 13. Method 900 further comprises removing conductive sleeve 1130 (block 912) and removing protective sleeve 1030 (block 914), as shown, for example, in FIG. 14. During electromagnetic forming 910, a high intensity changing magnetic field is applied to induce a circulating electrical current in first end 131*a* of torque tube 130. The induced current creates a new magnetic field around first end 131*a*, and this new magnetic field repels the applied magnetic field causing deformation of first end 131*a*. Specifically, first end 131*a* having protective sleeve 1030 and conductive sleeve 1130 installed over its outer surface 154 and first end fitting 110*a* inserted into first end 131*a*, is placed in proximity to a heavily constructed coil of wire, which may be referred to as a work coil. A large pulse of current is forced through the work coil by rapidly discharging a high voltage capacitor bank using an ignitron or a spark gap as a switch. This pulsing creates a rapidly oscillating strong electromagnetic field around the work coil that significantly exceeds the yield strength of the material of torque tube 130. As a result, torque tube 130 is deformed or, more specifically, forced against outer coupling surface 114 of first end fitting 110*a* until torque tube 130 conforms to outer coupling surface 114.

Figure 10:
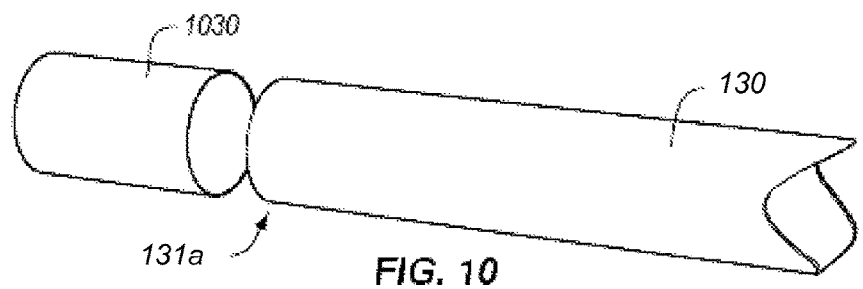
Figure 11:
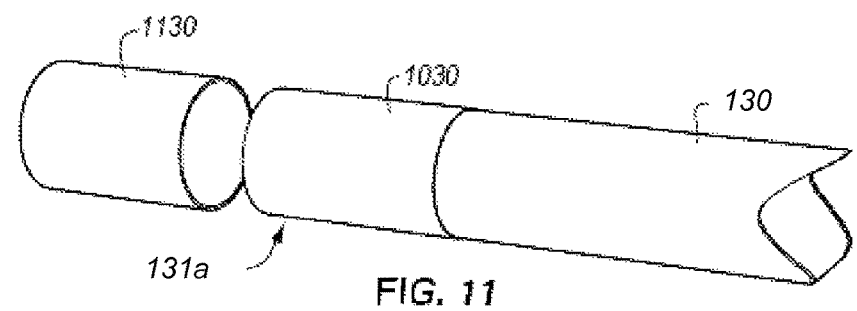
Figure 12:
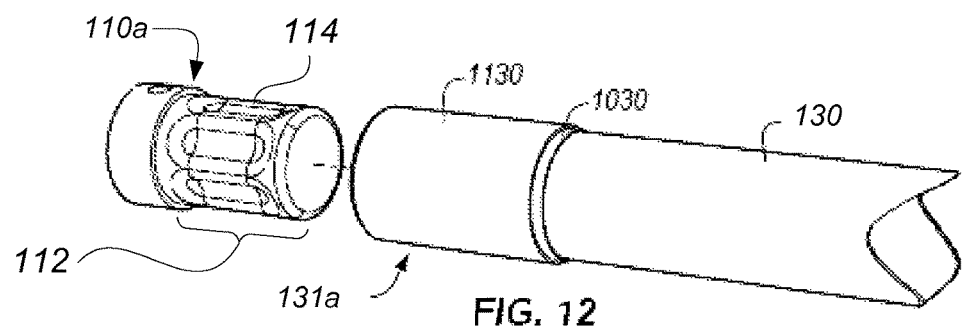
Figure 13:
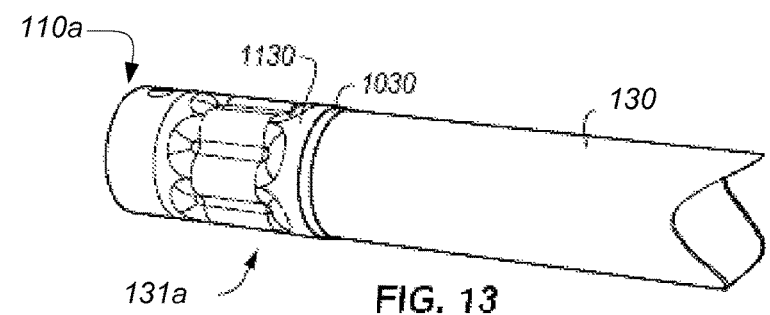
Figure 14:
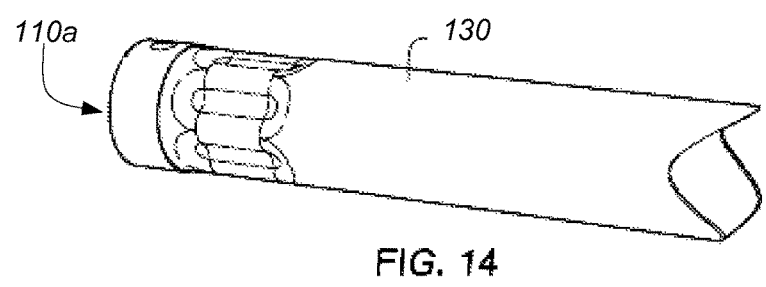

Referring e.g. to FIGS. 1, 10, and 11, in aspect 17 of the present disclosure, which includes at least a portion of the subject matter aspect 16 and may also include at least a portion of the subject matter of any other aspect or aspects disclosed herein, protective sleeve 1030 comprises plastic. Conductive sleeve 1130 comprises copper. Copper may be used when torque tube 130 is made from titanium or any other material having a relative high resistivity (e.g., a resistivity of greater than $1 \times 10^{-6}$ Ohm-cm) in comparison, for example, to aluminum. For more conductive materials (e.g., a resistivity of less than $1 \times 10^{-6}$ Ohm-cm), conductive sleeve 1130 may comprise aluminum. Referring e.g. to FIGS. 1, 5, 9, and 12, in aspect 18 of the present disclosure, which includes at least a portion of the subject matter of any of aspects 16-17 and may also include at least a portion of the subject matter of any other aspect or aspects disclosed herein, prior to electromagnetically forming first end 131*a* of torque tube 130 (block 910), a perimeter length of first virtual cross-section 118 of outer coupling surface 114 of tube engagement portion 112 of first end fitting 110*a* is substantially equal to an inner perimeter length of a cross-section of torque tube 130. For purposes of this disclosure, the term "substantially equal" refer to the difference between the perimeter length of outer coupling surface 114 of first virtual cross-section 118 (see, e.g., FIG. 5) and the inner perimeter length of a cross-section of torque tube 130 being less than 1% or even less than 0.5%. If the perimeter length of inner coupling surface 134 is much greater than the inner perimeter length of a cross-section of torque tube 130, then inner coupling surface 134 may formed over outer coupling surface 114 may have wrinkles. On the other hand, if the length of inner coupling surface 134 is much smaller than the inner perimeter length of a cross-section of torque tube 130, then the walls of torque tube 130 in end fitting engagement portion 132 may be excessively stretched, which may result in loss of mechanical integrity. It should be noted that after electromagnetic forming 910, inner coupling surface 134 and outer coupling surface 114 coincide, therefore, at this stage, the perimeter length of inner coupling surface 134 matches the perimeter length of outer coupling surface 114. Overall, changes in the length of inner coupling surface 134 during electromagnetic forming 910 are undesirable and should be minimized.

Referring e.g. to FIGS. 1, 3A-3B, and 4A-4B, in aspect 19 of the present disclosure, which includes at least a portion of the subject matter of any of aspects 16-18 and may also include at least a portion of the subject matter of any other aspect or aspects disclosed herein, outer coupling surface 114 of tube engagement portion 112 of first end fitting 110*a* comprises at least one first concavity 124 and at least one first convexity 126. All contours of outer coupling surface 114 are smooth. Outer coupling surface 114 of tube engagement portion 112 is shown in FIGS. 3A-3B and 4A-4B. Specifically, first concavity 124 and first convexity 126 are shown in two different sectional views, i.e., as a part of first virtual cross-section 118 in FIGS. 3A-3B and as a part of first virtual longitudinal section 121 in FIGS. 4A-4B. In both of these figures, first concavity 124 and first convexity 126 are represented by smooth curves that do not have any corner vertices. This aspect is described above with respect to first virtual tangent lines 120 and fourth virtual tangent lines 123. Furthermore, this aspect demonstrates, at least in part, that all contours of outer coupling surface 114 are smooth.

Referring e.g. to FIGS. 1, 7A, 7B, 8, and 9, in aspect 20 of the present disclosure, which includes at least a portion of the subject matter of aspect 19 and may also include at least a portion of the subject matter of any other aspect or aspects disclosed herein, after electromagnetically forming first end 131*a* of torque tube 130 (FIG. 9, block 910), inner coupling surface 134 of end fitting engagement portion 132 of first end 131*a* of torque tube 130 comprises at least one second convexity 174 complementary to at least one first concavity 124. Inner coupling surface 134 also comprises at least one second concavity 170 complementary to at least one first convexity 126. All contours of inner coupling surface 134 are smooth. Inner coupling surface 134 of torque tube 130 is shown in FIGS. 7 and 8. Specifically, second concavity 170 and second convexity 174 are shown in two different sectional views, i.e., as a part of first virtual cross-section 138 in FIG. 7 and as a part of second virtual longitudinal section 144 in FIG. 8. In both of these figures, second concavity 170 and second convexity 174 are represented by smooth curves that do not have any corner vertices. This aspect is described above with respect to second virtual tangent lines 143 and fifth virtual tangent lines 146. Furthermore, this aspect demonstrates, at least in part, that all contours of inner coupling surface 134 are smooth.

Referring e.g. to FIGS. 1, 6A-6B, 7A-7B, and 9, in aspect 21 of the present disclosure, which includes at least a portion of the subject matter of any of aspects 16-20 and may also include at least a portion of the subject matter of any other aspect aspects disclosed herein, after electromagnetically forming first end 131a of torque tube 130 (block 910), outer surface 154 of end fitting engagement portion 132 of first end 131a of torque tube 130 comprises at least one third concavity 180 and at least one third convexity 184. All contours of outer surface 154 are smooth. Outer surface 154 of torque tube 130 is shown in FIGS. 7A, 7B, and 8. Specifically, third concavity 180 and third convexity 184 are shown in two different sectional views, i.e., as a part of third virtual cross-section 156 in FIGS. 7A and 7B and as a part of third virtual longitudinal section 162 in FIG. 8. In both of these figures, third concavity 180 and third convexity 184 are represented by smooth curves that do not have any corner vertices. This aspect is described above with respect to third virtual tangent lines 160 and sixth virtual tangent lines 166. Furthermore, this aspect demonstrates, at least in part, that all contours of outer surface 154 are smooth.

Examples of the present disclosure may be described in the context of aircraft manufacturing and service method 1500 as shown in FIG. 15 and aircraft 1602 as shown in FIG. 16. During pre-production, illustrative method 1500 may include specification and design (block 1504) of aircraft 1502 and material procurement (block 1506). During production, component and subassembly manufacturing (block 1508) and system integration (block 1510) of aircraft 1502 take place. Thereafter, aircraft 1502 may go through certification and delivery (block 1512) to be placed in service (block 1514). While in service by a customer, aircraft 1502 may be scheduled for routine maintenance and service (block 1516). Routine maintenance and service may also include modification, reconfiguration, refurbishment, etc. of one or more systems of aircraft 1502.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 16, aircraft 1602 produced by illustrative method 1600 may include airframe 1618 with a plurality of high-level systems 1620 and interior 1622. Examples of high-level systems 1620 include one or more of propulsion system 1624, electrical system 1626, hydraulic system 1628, and environmental system 1630. Any number of other systems may be included. Although an aerospace example is shown, the principles disclosed herein may be applied to other industries, such as the automotive industry. Accordingly, in addition to aircraft 1602, the principles disclosed herein may apply to other vehicles, e.g., land vehicles, marine vehicles, space vehicles, etc.

Apparatus and methods shown or described herein may be employed during any one or more of the stages of the manufacturing and service method 1500. For example, components or subassemblies corresponding to component and subassembly manufacturing (block 1508) may be fabricated or manufactured in a manner similar to components or subassemblies produced while aircraft 1602 is in service. Also, one or more aspects of the apparatus, method, or combination thereof may be utilized during production stages (blocks 1508 and 1510), for example, by substantially expediting assembly of or reducing the cost of aircraft 1602. Similarly, one or more aspects of the apparatus or method realizations, or a combination thereof, may be utilized, for example and without limitation, while aircraft 1602 is in service, e.g., maintenance and service stage (block 1616).

Different aspects and examples of the apparatus and methods disclosed herein include a variety of components, features, and functionalities. It should be understood that the various aspects and examples of the apparatus(es) and method(s) disclosed herein may include any of the components, features, and functionalities of any of the other aspects and examples of the apparatus(es) and method(s) disclosed herein in any combination, and all of such possibilities are intended to be within the spirit and scope of the present disclosure.

Many modifications of aspects and examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific aspects and examples presented and that modifications and other aspects and examples are intended to be included within the scope of the appended claims. Moreover, although the foregoing description and the associated drawings describe aspects and examples of the present disclosure in the context of certain illustrative combinations of elements and/or functions, it should be appreciated that different combinations of elements and/or functions may be provided by alternative implementations without departing from the scope of the appended claims.

What is claimed is:

1. A method for manufacturing an apparatus, the method comprising:
    installing a protective sleeve over a first end of a torque tube;
    installing a conductive sleeve over the protective sleeve;
    inserting a first end fitting into the first end of the torque tube,
        wherein a tube engagement portion of the first end fitting is inserted into the first end of the torque tube, the tube engagement portion comprising an outer coupling surface;
    electromagnetically forming the first end of the torque tube to conform the torque tube to an outer coupling surface of the first end fitting;
    removing the conductive sleeve; and
    removing the protective sleeve.

2. The method as in claim 1, wherein the protective sleeve comprises plastic, and wherein the conductive sleeve comprises copper.

3. The method as in claim 1, wherein, prior to electromagnetically forming the first end of the torque tube, a perimeter length of a first virtual cross-section of the outer coupling surface of the tube engagement portion of the first end fitting is substantially equal to an inner perimeter length of a cross-section of the torque tube.

4. The method as in claim 1, wherein the outer coupling surface of the tube engagement portion of the first end fitting comprises at least one first concavity and at least one first convexity, and wherein all contours of the outer coupling surface are smooth.

5. The method as in claim 4, wherein, after electromagnetically forming the first end of the torque tube, an inner coupling surface of an end fitting engagement portion of the first end of the torque tube comprises at least one second convexity complementary to the at least one first concavity of the outer coupling surface of the tube engagement portion, the inner coupling surface further comprising at least one second concavity complementary to the at least one first convexity of the outer coupling surface of the tube engagement portion, and wherein all contours of the inner coupling surface are smooth.

6. The method as in claim 5, wherein, after electromagnetically forming the first end of the torque tube, the inner coupling surface comprises at least one second flat.

7. The method as in claim 1, wherein, after electromagnetically forming the first end of the torque tube, an outer surface of an end fitting engagement portion of the first end of the torque tube comprises at least one third concavity and at least one third convexity, and wherein all contours of the outer surface are smooth.

8. The method as in claim 7, wherein, after electromagnetically forming the first end of the torque tube, the outer surface of the end fitting engagement portion of the torque tube comprises at least one third flat.

9. The method as in claim 7, wherein the at least one third concavity comprises a smallest radius of curvature of between 0.125 and 0.25 inches.

10. The method as in claim 1, wherein the torque tube comprises titanium.

11. The method as in claim 1, wherein the torque tube has a wall thickness between about 0.04 and about 0.06 inches.

12. The method as in claim 1, wherein:
the first end fitting further comprises a connector portion adjacent the tube engagement portion, and
the connector portion comprises means for connecting the apparatus to one of a drive unit or a driven unit.

13. The method as in claim 1, wherein, after electromagnetically forming the first end of the torque tube, a first virtual cross-section of the outer coupling surface of the tube engagement portion comprises a first transverse inflection point, and wherein each point along the first virtual cross-section has a first virtual tangent line coplanar with the first virtual cross-section.

14. The method as in claim 13, wherein, after electromagnetically forming the first end of the torque tube:
an inner coupling surface of an end fitting engagement portion has a second virtual cross-section coplanar with and complementary to the first virtual cross-section,
the second virtual cross-section comprises a second transverse inflection point, and
each point along the second virtual cross-section has a second virtual tangent line coplanar with the second virtual cross-section.

15. The method as in claim 14, wherein, after electromagnetically forming the first end of the torque tube:
an outer surface of the end fitting engagement portion has a third virtual cross-section coplanar with the second virtual cross-section,
the third virtual cross-section comprises a third transverse inflection point, and
each point along the third virtual cross-section has a third virtual tangent line coplanar with the third virtual cross-section.

16. The method as in claim 1, wherein, after electromagnetically forming the first end of the torque tube:
the outer coupling surface of the tube engagement portion comprises a first virtual longitudinal section,
the first virtual longitudinal section comprises a first longitudinal inflection point, and
each point along the first virtual longitudinal section has a fourth virtual tangent line coplanar with the first virtual longitudinal section.

17. The method as in claim 16, wherein, after electromagnetically forming the first end of the torque tube:
an end fitting engagement portion of the torque tube is conformed to the tube engagement portion of the first end fitting,
the end fitting engagement portion comprises an inner coupling surface,
the inner coupling surface has a second virtual longitudinal section coplanar with and complementary to the first virtual longitudinal section,
the second virtual longitudinal section comprises a second longitudinal inflection point, and
each point along the second virtual longitudinal section has a fifth virtual tangent line coplanar with the second virtual longitudinal section.

18. The method as in claim 17, wherein, after electromagnetically forming the first end of the torque tube:
an outer surface of the end fitting engagement portion comprises a third virtual longitudinal section coplanar with the second virtual longitudinal section,
the third virtual longitudinal section comprises a third longitudinal inflection point, and
each point along the third virtual longitudinal section has a sixth virtual tangent line coplanar with the third virtual longitudinal section.

19. The method as in claim 1, wherein, after electromagnetically forming the first end of the torque tube, the outer coupling surface comprises at least one first flat.

* * * * *